US011117526B2

(12) United States Patent
Iverson

(10) Patent No.: US 11,117,526 B2
(45) Date of Patent: *Sep. 14, 2021

(54) CELL PHONE MOUNT WITH SLIDABLE JAWS

(71) Applicant: MACNEIL IP LLC, Bolingbrook, IL (US)

(72) Inventor: David S. Iverson, Oak Brook, IL (US)

(73) Assignee: MACNEIL IP LLC, Bolingbrook, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/887,682

(22) Filed: May 29, 2020

(65) Prior Publication Data
US 2020/0290522 A1 Sep. 17, 2020

Related U.S. Application Data

(63) Continuation-in-part of application No. 16/791,121, filed on Feb. 14, 2020, now Pat. No. 11,038,996,
(Continued)

(51) Int. Cl.
*H04M 1/00* (2006.01)
*B60R 11/02* (2006.01)
(Continued)

(52) U.S. Cl.
CPC ........ *B60R 11/0241* (2013.01); *H04B 1/3888* (2013.01); *B60R 2011/0007* (2013.01);
(Continued)

(58) Field of Classification Search
CPC ............... B60R 7/00; B60R 2011/0007; B60R 2011/0014; B60R 2011/0075;
(Continued)

(56) References Cited

U.S. PATENT DOCUMENTS

D247,548 S 3/1978 Crary
D289,898 S 5/1987 Miller
(Continued)

FOREIGN PATENT DOCUMENTS

CN 106427807 2/2017

OTHER PUBLICATIONS amazon.com, website, image of Belkin Car Cup Holder for Smartphones, downloaded on Jan. 17, 2019.
(Continued)

*Primary Examiner* — Huy C Ho
(74) *Attorney, Agent, or Firm* — Perkins IP Law Group LLC; Jefferson Perkins

(57) ABSTRACT

A personal electronic device mount has a mounting bracket with a left jaw, a right jaw and a central support. The mount, which can be used for large cell phones, permits the device to be held in either a "portrait" orientation or a "landscape" orientation. Each of the left jaw, right jaw and central support has an engagement plate with plural corrugations that constrain the left and right jaws to horizontal sliding movement. The corrugations form surfaces on each of the engagement plates which interface with corresponding surfaces on each of the other engagement plates. The engagement plates of the left and right jaws move with respect to each other and with respect to the engagement plate of the central support. A left jaw clamp and a right jaw clamp independently affix the left jaw engagement plate and the right jaw engagement plate to the central support engagement plate at positions as desired by the user.

27 Claims, 11 Drawing Sheets

Related U.S. Application Data which is a continuation of application No. 16/573,063, filed on Sep. 17, 2019, now Pat. No. 10,576,905, which is a continuation-in-part of application No. 16/172,826, filed on Oct. 28, 2018, now Pat. No. 10,717,396.

(51) Int. Cl.
  *H04B 1/3888* (2015.01)
  *B60R 11/00* (2006.01)

(52) U.S. Cl.
  CPC ............... *B60R 2011/0075* (2013.01); *B60R 2011/0082* (2013.01); *B60R 2011/0084* (2013.01)

(58) Field of Classification Search
  CPC ..... B60R 2011/0077; B60R 2011/0078; B60R 2011/008; B60R 2011/0082; B60R 2011/0084; B60R 2011/0085; B60R 2011/0087; B60R 2011/0089; B60R 2011/0091; B60R 2011/0092; H04B 1/3888; H04B 1/082
  USPC ....................................................... 455/457.1
  See application file for complete search history.

(56) References Cited

U.S. PATENT DOCUMENTS

| | | |
|---|---|---|
| 4,854,468 A | 8/1989 | Dahlquist, II et al. |
| D309,307 S | 7/1990 | Sigurdson |
| 5,052,649 A | 10/1991 | Hunnicutt |
| D322,891 S | 1/1992 | Samuelson et al. |
| 5,088,673 A | 2/1992 | Chandler |
| 5,102,086 A | 4/1992 | Thomason |
| 5,135,195 A | 8/1992 | Dane |
| 5,174,534 A | 12/1992 | Mitchell |
| 5,180,088 A | 1/1993 | de Angeli |
| 5,285,938 A | 2/1994 | Fauchald |
| 5,285,953 A | 2/1994 | Smith |
| D361,017 S | 8/1995 | Keven |
| D370,392 S | 6/1996 | Flanagan |
| D376,959 S | 12/1996 | Norris |
| D377,740 S | 2/1997 | Swanson |
| D380,650 S | 7/1997 | Norris |
| 5,651,523 A | 7/1997 | Bridges |
| 5,669,538 A | 9/1997 | Ward |
| 5,676,340 A | 10/1997 | Ruhnau |
| 5,745,565 A | 4/1998 | Wakefield |
| D397,915 S | 9/1998 | McNaughton |
| D400,763 S | 11/1998 | Taylor et al. |
| D402,666 S | 12/1998 | Golder |
| D407,408 S | 3/1999 | Hoff |
| 5,897,041 A | 4/1999 | Ney et al. |
| 6,019,325 A | 2/2000 | Dotson et al. |
| D422,182 S | 4/2000 | Miljanich |
| 6,062,518 A | 5/2000 | Etue |
| 6,099,062 A | 8/2000 | Siegel |
| 6,113,049 A | 9/2000 | Miljanich |
| 6,189,755 B1 | 2/2001 | Wakefield |
| D439,116 S | 3/2001 | White |
| 6,246,766 B1 | 6/2001 | Walsh |
| 6,253,982 B1 | 7/2001 | Gerardi |
| 6,267,340 B1 | 7/2001 | Wang |
| 6,315,153 B1 | 11/2001 | Osborn |
| D451,504 S | 12/2001 | Edwards |
| D452,236 S | 12/2001 | Kohli |
| 6,543,637 B1 | 4/2003 | Osborn |
| D475,044 S | 5/2003 | Kohli et al. |
| 6,827,318 B1 | 12/2004 | Li |
| D501,118 S | 1/2005 | Schrock |
| D513,938 S | 1/2006 | Griffin |
| D516,393 S | 3/2006 | Wickenhauser |
| 7,099,466 B2 | 8/2006 | Walsh |
| 7,099,467 B1 | 8/2006 | Rohrbach |
| 7,140,586 B2 | 11/2006 | Seil et al. |
| 7,194,087 B2 | 3/2007 | Luginbill et al. |
| 7,246,555 B2 | 7/2007 | Small et al. |
| D551,912 S | 10/2007 | Cooke |
| D558,769 S | 1/2008 | Krieger et al. |
| 7,597,301 B2 | 10/2009 | Seil |
| 7,668,309 B2 | 2/2010 | Wilcox |
| 7,708,247 B2 | 5/2010 | Lota |
| D625,715 S | 10/2010 | Adams, II |
| D643,252 S | 8/2011 | Seidl |
| 8,061,670 B1 | 11/2011 | White |
| D651,473 S | 1/2012 | Cribb |
| D654,119 S | 2/2012 | Lin |
| D655,282 S | 3/2012 | Richter |
| D687,437 S | 8/2013 | Hagenauer |
| D705,211 S | 5/2014 | Huang |
| D709,066 S | 7/2014 | Byun |
| 8,777,307 B2 | 7/2014 | Nelson et al. |
| D718,298 S | 11/2014 | Aspinall et al. |
| 8,922,354 B2 | 12/2014 | Nagara et al. |
| 9,079,545 B2 | 7/2015 | Dugan |
| 9,161,466 B2 * | 10/2015 | Huang ............... F16M 11/105 |
| 9,162,630 B2 | 10/2015 | Pluta |
| 9,254,793 B2 | 2/2016 | Won |
| D767,279 S | 9/2016 | Gummo |
| D771,614 S | 11/2016 | Chang |
| D777,720 S | 1/2017 | Russell |
| 9,573,532 B2 * | 2/2017 | Riddiford ............... F16B 2/12 |
| 9,616,793 B2 | 4/2017 | Lliorca |
| D788,571 S | 6/2017 | Richter |
| 9,698,851 B2 | 7/2017 | Andrus |
| 9,758,248 B2 | 9/2017 | Procter et al. |
| D799,469 S | 10/2017 | Esses |
| 9,821,723 B2 | 11/2017 | Mannarino |
| D807,701 S | 1/2018 | Bo |
| D809,998 S | 2/2018 | Dabel et al. |
| 9,900,417 B1 | 2/2018 | Ruiz |
| D817,317 S | 5/2018 | Lee |
| 9,987,993 B2 | 6/2018 | Thorimbert |
| D823,062 S | 7/2018 | Goodwin et al. |
| D832,248 S | 10/2018 | Sukphist et al. |
| D833,369 S | 11/2018 | Changwen |
| D835,113 S | 12/2018 | Kim |
| 10,155,482 B2 | 12/2018 | Corso |
| D837,613 S | 1/2019 | Nichols |
| 10,183,604 B2 | 1/2019 | Krishnan |
| D845,962 S | 4/2019 | Yao et al. |
| D848,412 S | 5/2019 | Greve et al. |
| D848,443 S | 5/2019 | Yao et al. |
| 10,284,250 B2 | 5/2019 | Andrus |
| 10,308,155 B1 | 6/2019 | Cline |
| 10,315,585 B2 | 6/2019 | Minn et al. |
| D858,438 S | 9/2019 | Levy |
| D859,395 S | 9/2019 | Yao et al. |
| D867,346 S | 11/2019 | Hofstede |
| D867,999 S | 11/2019 | Li |
| D868,036 S | 11/2019 | Sohn et al. |
| D868,540 S | 12/2019 | Kemker |
| D868,619 S | 12/2019 | Fohr |
| D868,740 S | 12/2019 | Kang et al. |
| D869,328 S | 12/2019 | Nelson |
| D869,951 S | 12/2019 | Yi et al. |
| D870,040 S | 12/2019 | Wu |
| D870,094 S | 12/2019 | Ma |
| D870,923 S | 12/2019 | Panagiotis et al. |
| D871,149 S | 12/2019 | Kaiser |
| D871,152 S | 12/2019 | Hudson |
| D872,380 S | 1/2020 | Liu |
| D872,511 S | 1/2020 | Parks |
| D872,537 S | 1/2020 | Guccione |
| D872,539 S | 1/2020 | Hewitt et al. |
| D872,725 S | 1/2020 | Lindof |
| D872,727 S | 1/2020 | Chung |
| D873,205 S | 1/2020 | Macneil et al. |
| D877,043 S | 3/2020 | Macneil et al. |
| D878,279 S | 3/2020 | Macneil et al. |
| 2002/0049081 A1 | 4/2002 | Heininger |

(56) References Cited

U.S. PATENT DOCUMENTS

| | | | |
|---|---|---|---|
| 2002/0094078 A1 | 7/2002 | Edwards | |
| 2014/0176062 A1 | 6/2014 | Jung | |
| 2018/0001835 A1* | 1/2018 | Corso | H04M 1/04 |

OTHER PUBLICATIONS amazon.com, website, image of Custom Accessories 23384 Heavy Cup Mount Magnetic Phone Holder, downloaded on Jan. 17, 2019.
amazon.com, website, image of Macally Adjustable Automobile Cup Holder Phone Mount, downloaded on Jan. 17, 2019.
amazon.com, website, image of Mediabridge Smartphone Cradle w/Extended Cup Holder Mount, downloaded on Jan. 17, 2019.
amazon.com, website, image of NNDA CO Universal Adjustable Gooseneck Cup Holder Cradle Car Mount For Phone, downloaded on Jan. 17, 2019.
amazon.com, website, image of Sunjoyco Car Cup Holder Mount for Phone Tablet, 2-in-1 Car Cradles Adjustable Gooseneck Holder, downloaded on Jan. 17, 2019.
amazon.com, website, image of Tackform Solutions Car Phone Holder Magnetic Mount, downloaded on Jan. 17. 2019.
amazon.com, website, image of TNP Cup Holder Phone Mount, Universal Car Cup Smartphone Cradle Clamp w/Flexible Neck, downloaded on Jan. 17, 2019.
amazon.com, website, image of USA Gear Cup Holder Suction Mount Surface Adapter, downloaded on Jan. 17, 2019.
crutchfield.com, website, image of Bracketron BT 16572 PhabGrip cup holder mount, downloaded on Jan. 17, 2019.
HDAccessory.com, website, image of Universal Smartphone Cup Holder Mount, downloaded on Jan. 17, 2019.
stacksocial.com, website, image of U-Grip Cup Holder Car Mount for Phones and Tablets, downloaded on Jan. 17, 2019.
walmart.com, website, image of Universal Adjustable Gooseneck Cup Holder Cradle Car Mount for Cell Phone, downloaded on Jan. 17, 2019.
rakuten.com, website, image of Smartphone 8" Long Car Cup Holder, IKross Phone Mount, downloaded on Jan. 17, 2019.
Macally Cell Phone Cup Holder for Car Mount, Amazon.com, Date First Available: Jun. 29, 2017, [online], [site visited Oct. 24, 2019]. <URL: https://www.amazon.com/Macally-Samsung-Motorola-Smartphones-MCUP/dp/B002JTWRN8> (Year: 2017).
Cellet PH600 Car Cup Holder Mount, Amazon.com, [online], [site visited Oct. 24, 2019]. <URL:https://www.amazon.com/dp/B006BIQBMQref=psdc_2230642011_t4_B002JTWRN8> (Year: 2019).
10 Cup Holder Phone Mount Reviews for 2019, HotRate.com, By Joey Randall, Last Updated Jan. 25, 2019, [online], [site visited Oct. 24, 2019]. <URL: https://www.hotrate.com/electronics/cup-holder-phone-mount/> (Year: 2019).
CupFone, WeatherTech.com, [online], [site visited Jan. 16, 2020], <URL: https://www.weathertech.com/weathertech-cupfone/cupfone/> (Year: 2020).
WeatherTech CupFone: Up-Close Look, YouTube.com, WeatherTech, Published on Feb. 18, 2019, [online], [site visited Jan. 16, 2020]. <URL: https://www.youtube.com/watch?v=OARZXf2c6cU. (Year: 2019).
Green Sprouts Dream Window Stacking Cups 6 Counts, BabyPallet.com, [online], [site visited Jan. 16, 2020]. <URL https://babypallet.com/product/green-sprouts-dream-window-stacking-cups-6-counts/> (Year: 2020).

* cited by examiner

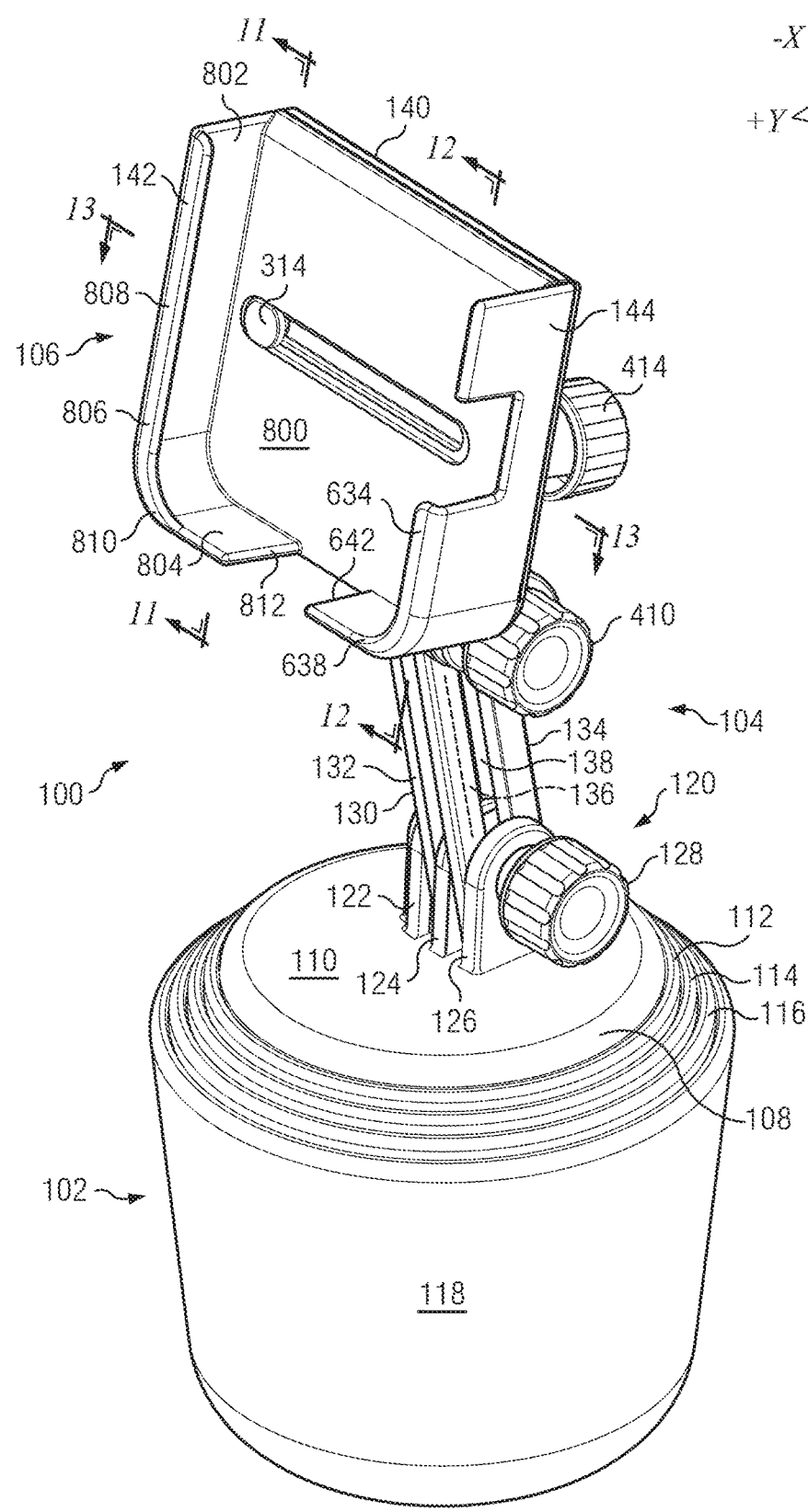
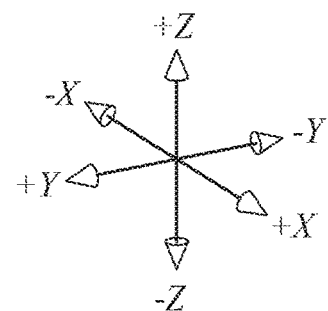
FIG. 1A
FIG. 1

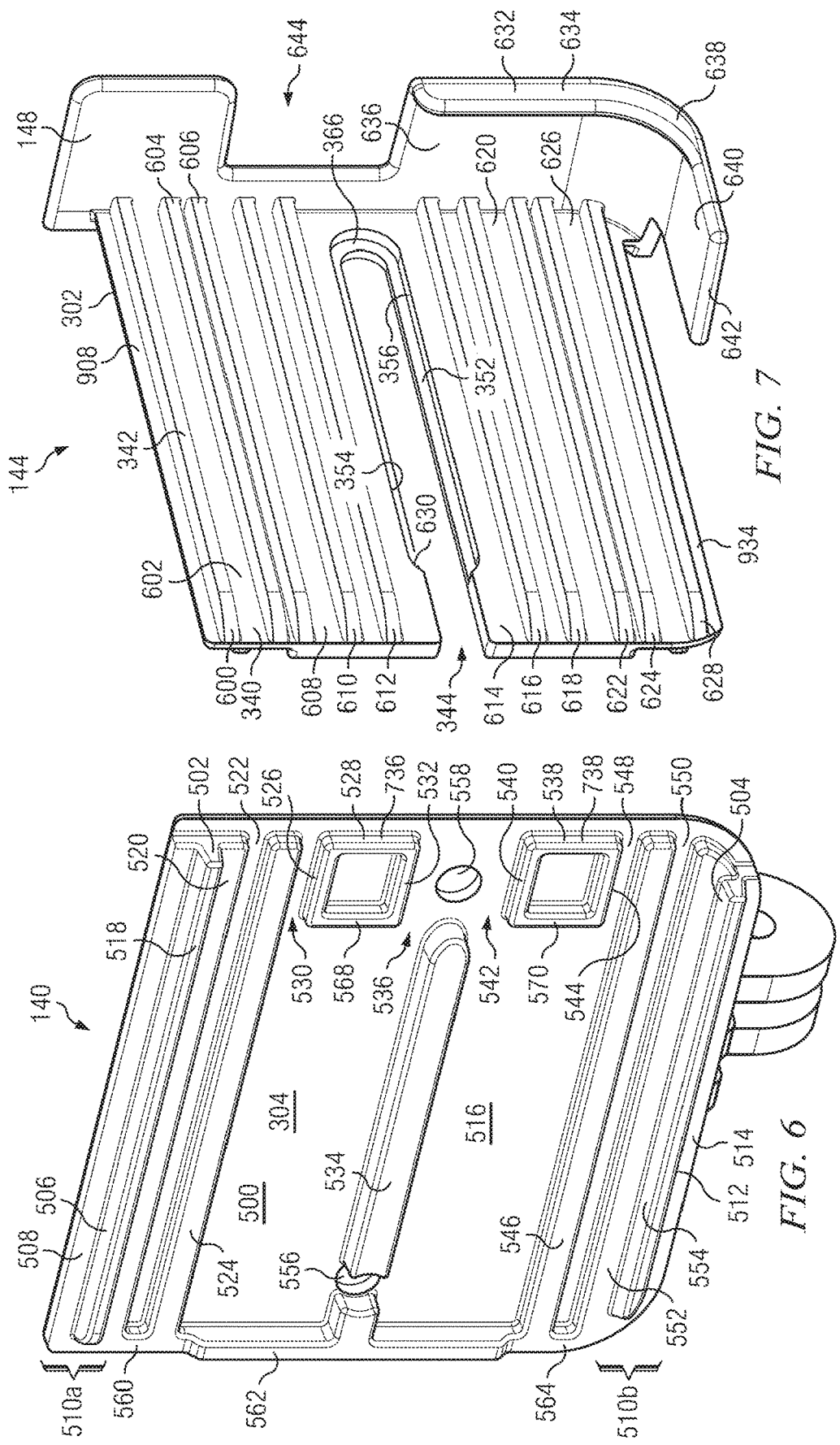

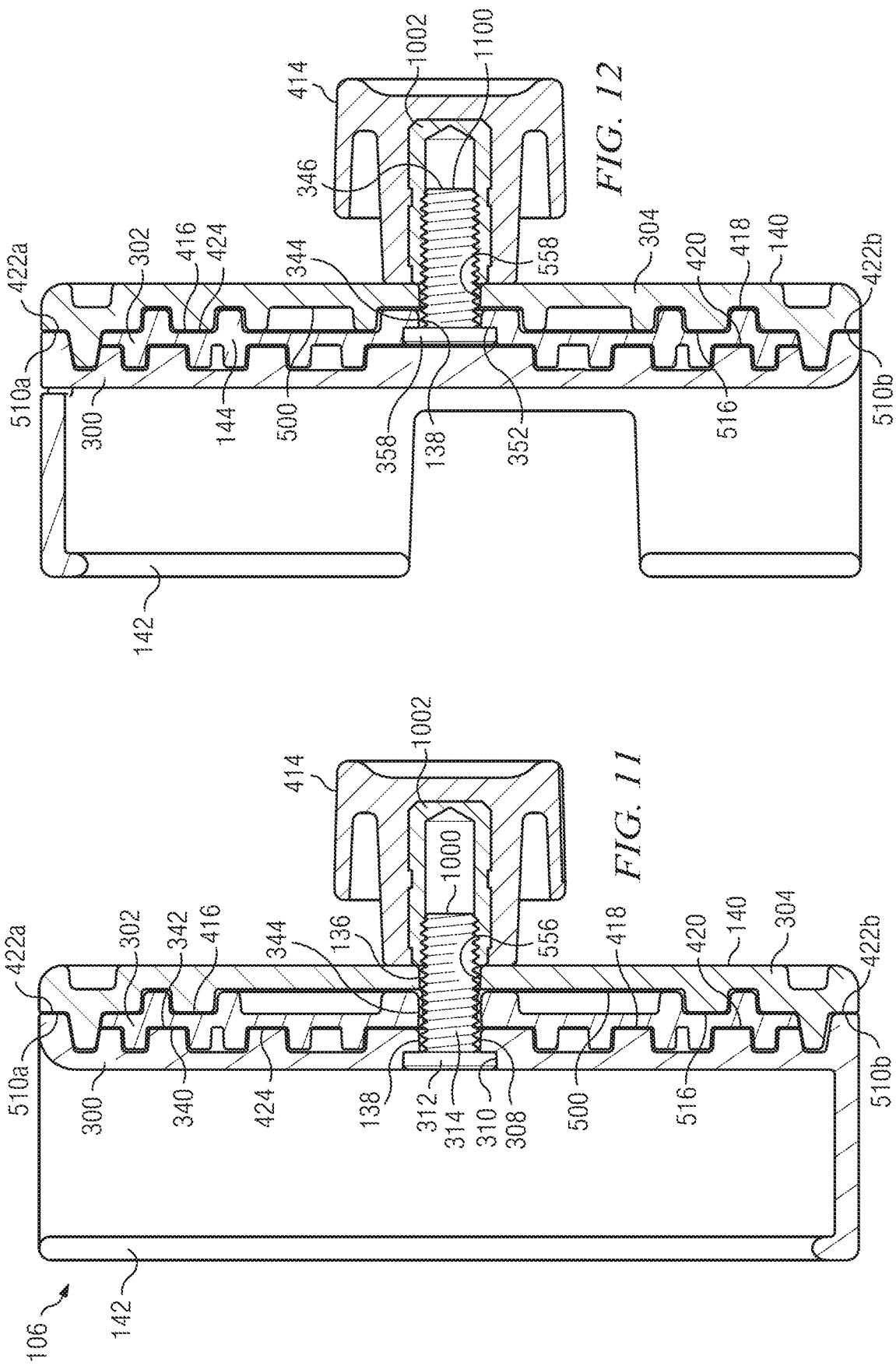

CELL PHONE MOUNT WITH SLIDABLE JAWS

RELATED APPLICATIONS

This application is continuation in part of copending U.S. patent application Ser. No. 16/791,121 filed Feb. 14, 2020, which in turn is a continuation of U.S. patent application Ser. No. 16/573,065 filed Sep. 17, 2019, now U.S. Pat. No. 10,576,905, which in turn is a continuation in part of copending U.S. patent application Ser. No. 16/172,826 filed Oct. 28, 2018. Applicant is the owner of the foregoing applications. The specification and drawings of the foregoing applications are fully incorporated by reference herein.

BACKGROUND OF THE INVENTION

Mounts for cell phones, and similar handheld electronic devices, are known in the art. For example, Applicant has developed a cell phone mount for installation in a vehicle cup holder, as described in U.S. Pat. No. 10,576,905. The cell phone mount described therein has a cell phone mounting bracket that has one fixed jaw and one jaw which slides horizontally relative to the fixed jaw. The movable jaw is adjusted for the width of the cell phone sought to be mounted, and is then tightened in place using a single clamp screw.

Over the past few years there has been a trend to cell phones with larger and larger screen areas. Also, users are now more frequently using their cell phones in "landscape" mode, in which the long dimension of the cell phone screen is oriented to the horizontal. Cell phone mounts currently on the market have trouble accommodating these larger-sized phones, particularly if the user seeks to mount them so that they are in a "landscape" rather than a "portrait" orientation. A need therefore exists for a mount for cell phones and other handheld electronic devices, such as tablets, that is capable of accepting relatively large devices in both portrait and landscape orientations.

SUMMARY OF THE INVENTION

According to one aspect of the invention, a taunt for a personal electronic device, such as a cell phone or a tablet, includes a base and a mounting bracket supported by the base and coupled thereto by a connector. The mounting bracket has a central support, a right jaw and a left jaw Each of the central support, right jaw and left jaw has an engagement plate. The central support engagement plate has a left jaw engagement surface and a right jaw engagement surface, each with a plurality of horizontally elongate central support corrugations. The right jaw engagement plate has a central support engagement surface and a left jaw engagement surface, each with a plurality of horizontally elongate right jaw corrugations. The left jaw engagement plate has a central support engagement surface and a right jaw engagement surface, each with a plurality of horizontally elongate left jaw corrugations.

The right jaw engagement plate is operable to slide horizontally with respect to the central support engagement plate, and the left jaw engagement plate likewise is operable to slide horizontally with respect to the central support engagement plate. When the right jaw engagement plate slides with respect to the central support engagement plate, ones of the right jaw corrugations slide along ones of the central support corrugations. When the left jaw engagement plate slides with respect to the central support engagement plate, ones of the left jaw corrugations slide along ones of the central support corrugations. And when the right jaw engagement plate slides with respect to the left jaw engagement plate, ones of the right jaw corrugations slide along ones of the left jaw corrugations. The corrugations act to stiffen the engagement plates of the left and right jaws and the central support, and constrain the movement of the left and right jaws with respect to the central support and with respect to each other in a horizontal direction. Once the positions of the engagement plates are adjusted so that the mounting bracket will fit to a predetermined length or width of a particular handheld electronic device, at least one clamp may be used to affix the left, and right jaws to the central support.

The right jaw engagement plate, the left jaw engagement plate and the central support engagement plate roughly occupy respective planes that are parallel to but are spaced from each other. In one embodiment the central support engagement plate is rearward of the right jaw engagement plate, and the right jaw engagement plate is rearward of the left jaw engagement plate. But the order from front to rear could be otherwise, and this in turn will determine on which face the coasting corrugations of each plate are formed. For example, the central support engagement plate could be disposed to the rear of the right jaw engagement plate, and a right jaw engagement surface of the central support plate could be formed on a portion of the front face of the central support engagement plate. This surface slides along a central support engagement surface formed on a rear face of the right jaw engagement plate. The central support engagement plate further could be disposed to the rear of the left jaw engagement plate, and a left jaw engagement surface of the central support plate could be formed on another portion of the front face of the central support engagement plate. This surface slides along a central support engagement surface formed on a portion of the rear face of the left jaw engagement plate. The left jaw engagement plate could be disposed forwardly of the right jaw engagement plate. In that embodiment, the right jaw engagement surface of the left jaw engagement plate is formed on a portion of the rear face of the left jaw engagement plate. The left jaw engagement surface of the right jaw engagement plate would be formed on a front face thereof.

Preferably, each of the corrugations includes at least one rib and at least one groove, all of which are disposed to be horizontal and to be parallel to each other.

According to another aspect of the invention, a mount for a personal electronic device, such as a cell phone or tablet, has a base and a mounting bracket supported on the base and coupled thereto by a connector. The mounting bracket includes a central support, a left jaw and a right jaw. Each of the central support, left jaw and right jaw has a respective engagement plate. The engagement plates of the right and left jaws are operable to horizontally slide with respect to the central support engagement plate. A side wall of the left jaw forwardly extends from the left jaw engagement plate and has a vertical section and a horizontal section. A vertical forward lip of the left jaw inwardly extends from a front end of the vertical section of the side wall. A horizontal forward lip of the left jaw upwardly extends from a front end of the horizontal section of the side wall. Similarly, the right jaw has a side wall that forwardly extends from the right jaw engagement plate. The side wall of the right jaw has a vertical section and a horizontal section. A vertical forward lip of the right jaw inwardly extends from a front end of the vertical section of the right side wall. A horizontal forward lip of the right jaw upwardly extends from a front end of the horizontal section of the right side wall. A left clamp is provided for clamping the left jaw engagement plate to the central support engagement plate, while a right clamp is provided for clamping the right jaw engagement plate to the central support engagement plate.

In one embodiment, the left jaw engagement plate is positioned forwardly of the right jaw engagement plate, while in another embodiment the reverse is the case. Thus, one of the right and left jaws is a first jaw, while the other of the right and left jaws is a second jaw. The engagement plate of the first jaw is disposed rearwardly of the engagement plate of the second jaw. A horizontally elongate first slot is formed in the first jaw engagement plate. A horizontally elongate second slot is formed in the second jaw engagement plate and to be aligned to the first slot. A shaft of a first clamp passes through the first slot. A shaft of a second clamp passes through both the first and second slots.

In one embodiment, front ends of the aforementioned shafts terminate in enlarged heads. These heads are received in respective horizontally elongate recesses that surround the first and second slots. In an embodiment, the first and second clamps are in the nature of screw clamps. In this embodiment, the recess surrounding the first slot has a straight top sidewall and a straight bottom sidewall. The head of the first clamp has a straight top side and a straight bottom side that respectively slide along the top and bottom sidewalls of the first recess. The top and bottom sidewalls therefore prevent the rotation of the first clamp shaft. Similarly, the recess surrounding the second slot has a straight top sidewall and a straight bottom sidewall. The bead of the second clamp has a straight top side and a straight bottom side that respectively slide along the top and bottom sidewalls of the second recess. The top and bottom sidewalls of the second recess therefore prevent the rotation of the second shaft.

In any of the above embodiments, the base may be selected from the group consisting of a stand adapted to be placed on horizontal surface, such as a desk, and an adapter fore insertion into a cup holder of a vehicle. In any of the above embodiments, the connector may include an elongate extension link, a top end of which is rotatably affixed to the central support, and a bottom end of which is affixed to the base. In alternative embodiments, the connector directly and rotatably affixes the central support to the base and does not include an extension link. In any of the above embodiments, the connector may be of the kind that permits the mounting bracket to rotate around a horizontal axis relative to the base.

In any of the above embodiments, one or both of the left and right jaws may have a cable channel or notch formed therein, such that, when the cell phone is presented in "landscape" condition and therefore when its power/communications port is located on one of its then-vertical sides, a power/communications cable (such as a firewire cable) may be inserted through the notch or channel and be inserted into the power/communications port of the device. In an embodiment, this channel or notch is provided in addition to an opening formed between the inner ends of the sidewalls of the left and right jaws. This opening is adapted to accept therethrough a power/communications port for connection to a power/communications port that will be located on the bottom of the cell phone when the cell phone is in a "portrait" orientation. The opening persists even when the left and right jaws are closed to a position in which they are closest together.

The present invention provides a personal electronic device mounting bracket in which the left and right jaws may be opened to receive a cell phone or the like lengthwise, or in "landscape" mode. Alternatively, the jaws of the mourning bracket may be more closed, so as to closely receive a cell phone widthwise, in which the cell phone is presented in "portrait" mode. The positions of the left and right jaws may be adjusted independently of each other, and may be tightened to the central support by tightening a respective screw clamp with a single hand. The cell phone, tablet or other personal electronic device may be connected to a power/communications cable, regardless of the orientation that the personal electronic device is in.

Unlike currently available models, the mounting bracket according to the invention does not need to "squeeze" or forcibly hold the cell phone. Most of the holders currently available substantially grab onto the phone so that the mounting bracket may be rotated and such that the phone is thereby rotated from a "portrait" mode to a "landscape" mode. This in turn means that there must be some squeezing or holding mechanism to lock onto the phone, increasing complexity and cost. This holding mechanism therefore must be released at the time the user wishes to extract the phone from the holder. On the other hand, the mounting bracket according to the invention needs no such squeezing or holding mechanism, as gravity holds the phone in either portrait or landscape position.

The present invention allows the phone to be easily put into or removed from the mounting bracket, while either in the portrait or landscape positions, and with a charging cord attached.

BRIEF DESCRIPTION OF THE DRAWINGS

Further aspects of the invention and their advantages can be discerned in the following detailed description as read in conjunction with the drawings of exemplary embodiments, in which like characters denote like parts and in which:

FIG. 1 is a top front perspective view of a mount for a cell phone or other personal electronic device, shown with left and right jaws in a closed position, and as shown mounted with an extension link to a base adapted to be inserted into a vehicle cup holder;

FIG. 1A illustrates a frame of reference used herein;

FIG. 6 is a front perspective view of a central support used in the mounting bracket assembly shown in FIGS. 3-5;

FIG. 7 is a front perspective view of a right jaw used in the mounting bracket assembly shown in FIGS. 3-5;

FIG. 11 is a sectional view taken substantially along Line 11-11 of FIG. 1;

FIG. 12 is a sectional view taken substantially along Line 12-12 of FIG. 1;

DETAILED DESCRIPTION

Figure 2:
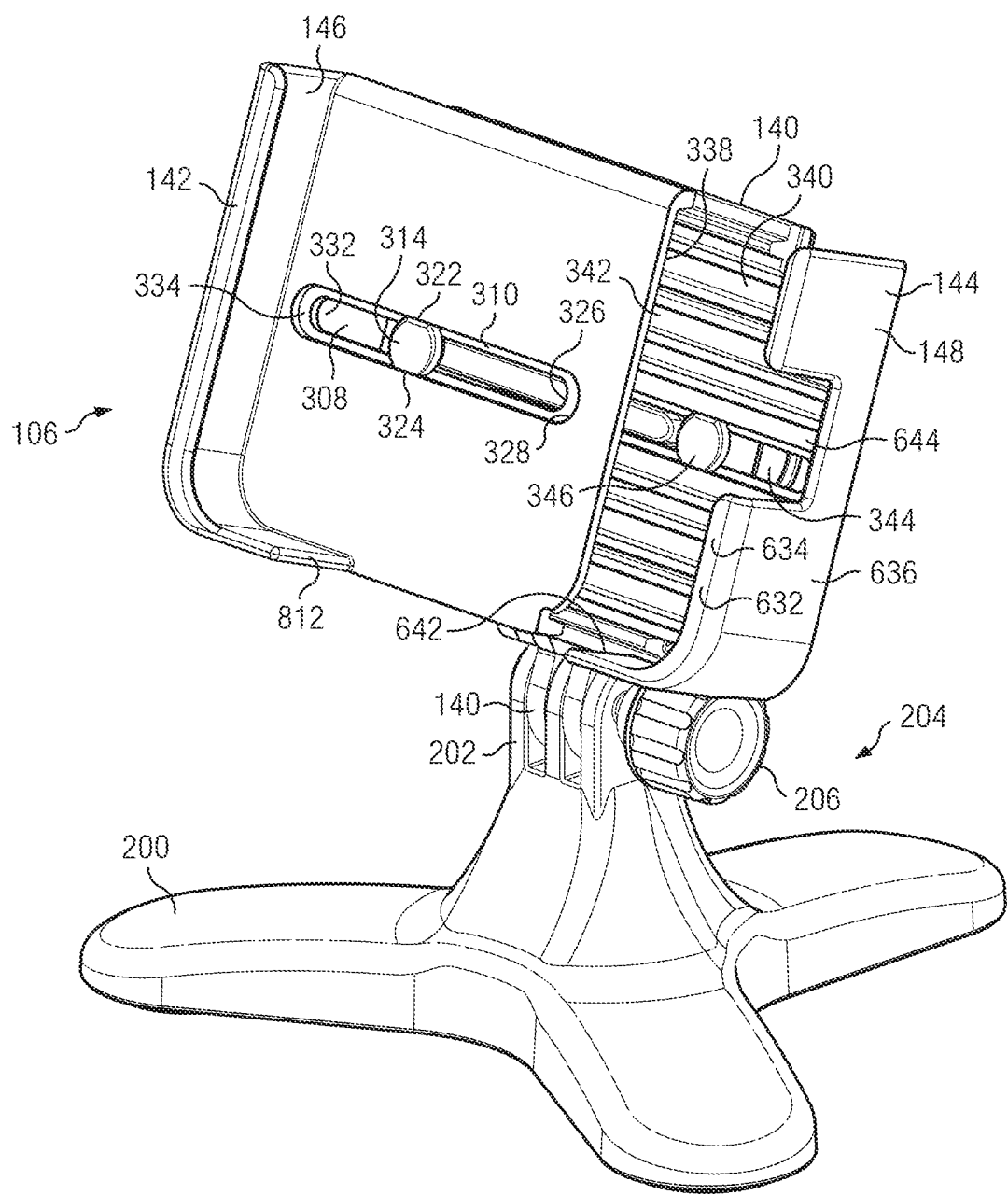
FIG. 2 is a top front perspective view of the cell phone mount shown in FIG. 1, but with the left and right jaws in an open position, and as shown supported directly on a base adapted to be placed on a horizontal surface.

A mount according to the invention is generally indicated by 100 in FIG. 1. The mount 100 has a base 102, a connector indicated generally at 104, and a mounting bracket 106.

In the embodiment illustrated in FIG. 1, the base 102 is in the nature of an adapter for insertion into a vehicle cup holder. The base 102 has a base component 108 having a sidewall (not shown) that is formed as a surface of rotation around a base axis, and a top 110. A plurality of hollow shells 112-118 are releasable attached, Russian-doll fashion, to the base component 108. A pier 120, comprised of a plurality of upstanding, parallel, spaced-apart pier plates 122-126, extends upwardly from the top 110. The structure and operation of base 102 is more fully set forth in U.S. Pat. No. 10,576,905, owned by Applicant and fully incorporated by reference herein.

In this illustrated embodiment, the connector 104 includes a lower clamp screw 128, an extension link 130 and an upper clamp screw (described below). The extension link is elongate and includes left and right extension link plates 132 and 134, into which are formed slots 136 and 138, A shaft of the clamp screw 128 passes through slots 136 and 138, as well as through bores made in the pier plates 122, 124 and 126. In this manner, a lower end of the extension link is slidably and rotatably affixed to the base 102. The structure and operation of extension link 130 is more fully set forth in Applicant's U.S. Pat. No. 10,576,905, incorporated by reference herein.

The mounting bracket has three main components: a central support 140, a left jaw 142 and a right jaw 144. Left jaw 142 and right jaw 144 are slidably adjustable relative to the central support 140 and relative to each other. In FIG. 1, jaws 142, 144 are shown in their fully closed condition, wherein a sidewall 146 of left jaw 142 is closest to a sidewall 148 of the right jaw 144.

FIG. 1A illustrates a frame of reference used herein to describe mounting bracket 106. A direction is mostly vertical. A y direction, at right angles to the z direction, is a depth direction, and proceeds from a rear of the mounting bracket 106 to the front. An x direction is side-to-side, is horizontal and is at right angles to directions y and z. As the mounting bracket 106 is tilted around a horizontal axis (described below), the y and z directions will tilt with it. In a typical use position, the z direction is tilted back somewhat from the vertical, and the y direction therefore is tilted up somewhat from the horizontal.

FIG. 2 illustrates mounting bracket 106 in a partially open position, in which the left jaw sidewall 146 is at an approximately half-open distance in the x direction from right jaw sidewall 148. In the embodiment shown in FIG. 2, the bracket 106 is mounted on a different base 200 that is adapted to be placed on a horizontal surface such as a counter or desk. The structure and operation of base 200 is more fully described in U.S. patent application Ser. No. 16/669,199 filed Oct. 30, 2019 and incorporated by reference herein. In this embodiment, the extension link 130 is omitted and instead, the central support 140 is directly and pivotally connected to an upstanding pier 202 of the base 200. The connector 204 comprises a single clamp screw 206 that is used to pivotally connect the pier 202 to the central support 140.

Figure 3:
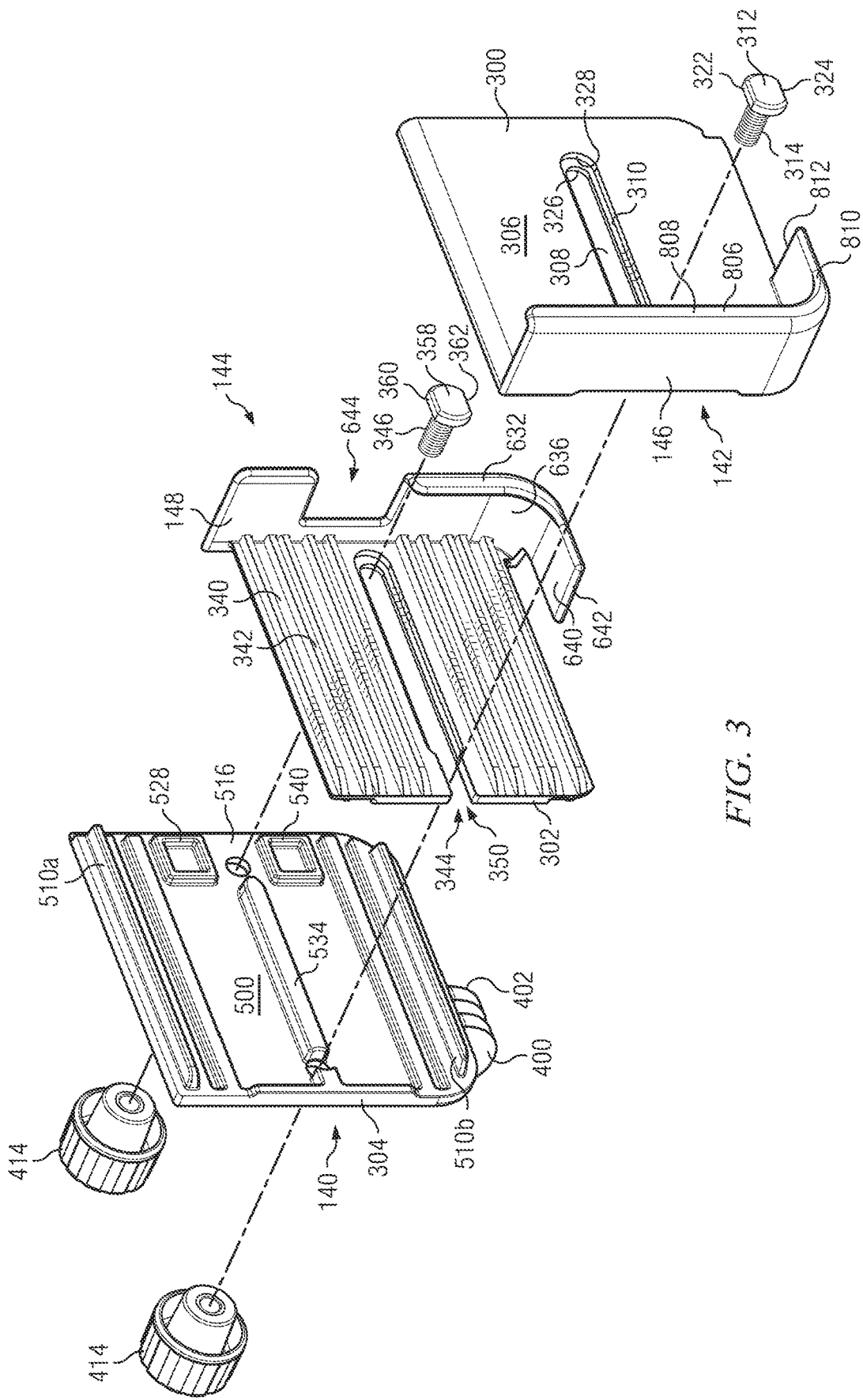
FIG. 3 is a top front perspective exploded view of a personal electronic device mounting bracket according to the invention.
Figure 4:
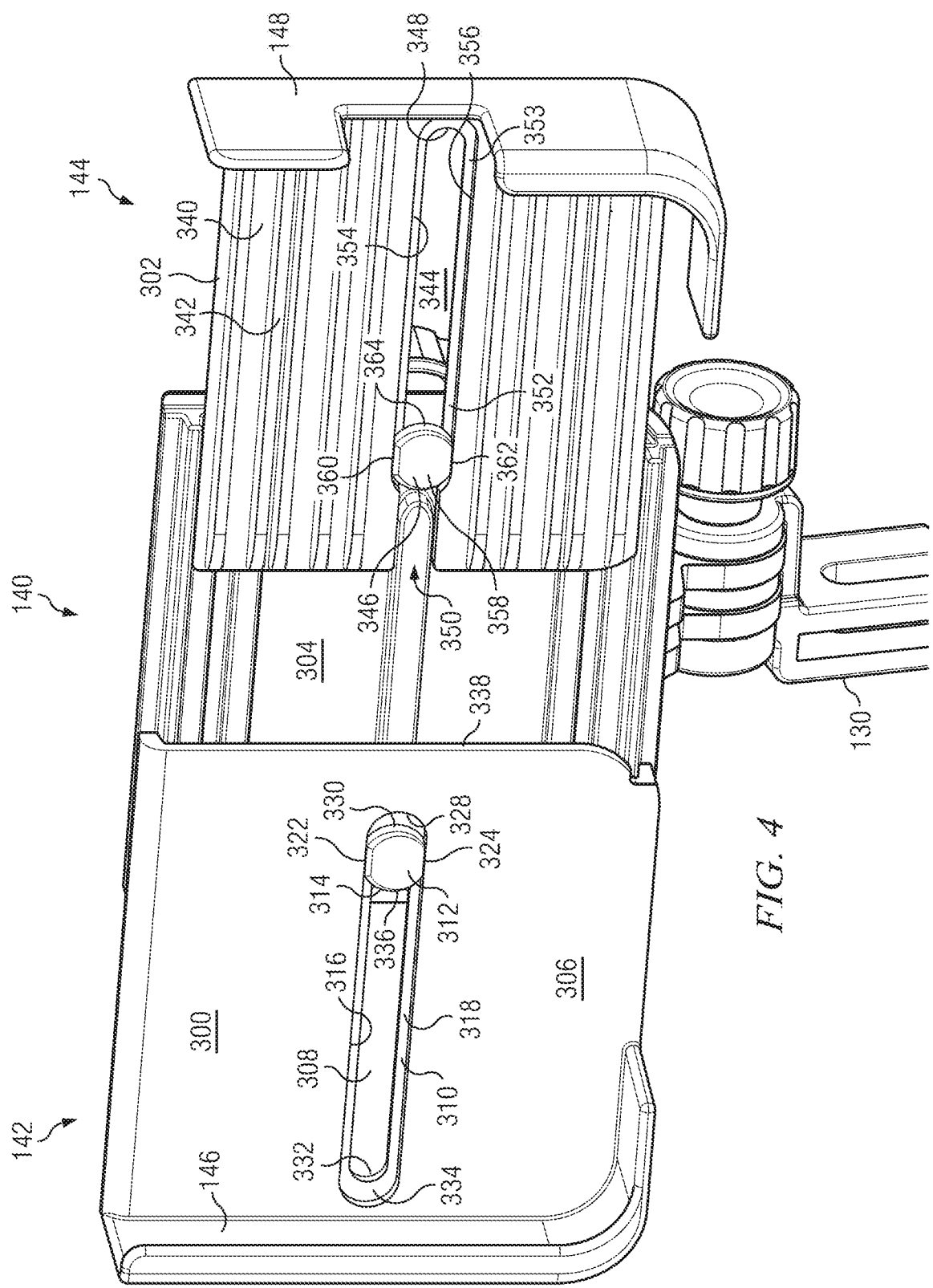
FIG. 4 is a front perspective view of a mounting bracket assembly, with right and left jaws shown in a maximum open position.

Further details of the mounting bracket 106 are seen in FIGS. 3 and 4. In this embodiment, the left jaw 142 has an engagement plate 300, the right jaw 144 has an engagement plate 302 and the central support 140 has an engagement plate 304. The engagement plates 300-304 roughly occupy xz planes that are parallel and slightly spaced from each other. In the illustrated embodiment, left jaw engagement plate 300 is in front, right jaw engagement plate 302 is in the middle, and central support engagement plate 304 is in the back. But the front-to-back order of the engagement plates 300-304 could be otherwise. Plate 300 could instead occupy the middle or back position, plate 302 could instead occupy the front or back position, and plate 304 could instead occupy one of the front and middle positions. But if one changes the front-to-back order of the engagement plates 300-304, one would also change where the engagement surfaces (described below) are placed on the plates 300-304.

In the illustrated embodiment, a front face 306 of the left jaw engagement plate 300 is flat and smooth, and is not used to form a surface that engages either of the other two plates 302, 304. A horizontally elongate slot 308 is formed through the engagement plate 300. This slot 308 is surrounded by a recess 310 that is made in the front face 306. The width (in the z direction) of the recess 310 is greater than the width of slot 308. A depth of the recess 310 the y direction, from the front face 306 to the slot 308, is enough to accommodate a depth of a head 312 of a left jaw clamping screw 314. The recess 310 has a straight upper sidewall 316 that is aligned to the x direction and which extends from the front face 306 to a floor 318 of the recess 310. The recess 310 has a straight lower sidewall 320, formed in parallel to the sidewall 316, which likewise is aligned to the x direction and which extends from the front face 306 to the recess floor 318. The bolt head 312 has a straight top side 322 that slidably engages top sidewall 316, and a straight bottom side 324, formed in parallel to the top side 322, that slidably engages lower sidewall 320. While bolt head 312 conveniently can have convexly curved sides as shown, it could also take a square shape, a hex shape or any other shape that included straight, parallel, x—oriented top and bottom sides 322, 324.

The horizontal movement of left jaw engagement plate 300 relative to central support engagement plate 304 can be constrained by closed ends of the slot 308. A right closed end 326 of the slot 308 acts as a stop to the leftward displacement of left jaw 142. An end surface 328 of the left jaw recess 310 may abut a side surface 330 of bolt head 312, and where bolt head 312 is convexly curved, this may be composed of a concavely curved surface as shown. The right closed end 326 of slot 308, in this configuration, will abut a shaft (described below) of the left clamping screw 314. In limiting the rightmost travel of left jaw 142, the shaft of clamping screw 314 may abut left closed, end 332 of shaft 308, a left side surface 336 of the bolt head 312 may abut the left end surface 334 of the recess 310, and/or a lateral inner end 338 of the engagement plate 300 may abut an inner surface of the right jaw sidewall 148. The engagement of bolt head top side 322 with recess top sidewall 316, and the engagement of the bolt head bottom side 324 with recess bottom sidewall 320, prevents the clamping screw shaft from turning on its axis.

In the illustrated embodiment, a front face 340 of the right jaw engagement plate 302 is not smooth but rather is corrugated to create a surface 342 that is adapted to slidably engage a rear surface of the left jaw engagement plate 300.

The left jaw engagement surface 342 of the right jaw engagement plate 300 will be described in further detail below. A horizontally elongate slot 344 in right jaw engagement plate has a width in they direction that will accommodate the shafts of the left clamping screw 314 and a right jaw clamping screw 346. The right jaw slot 344 has a closed right end 348 and an open left end 350. The right jaw slot 344 is centered within a recess 352 that is recessed from the rest of the front face 340 of the right jaw. The recess 352 has a top sidewall 354 that is straight and is aligned to the x direction, and a bottom sidewall 356 that is straight and is parallel to the top sidewall 354. A depth of the recess 352, in the y direction from the front face 340 to a recess floor 353, is sufficient to accommodate the thickness of a bead 358 of the right jaw clamping screw 346.

The bolt head 358 has a top side 360 that is straight and is aligned with the x direction. A bottom side 362 of the bolt head 358 is also straight and is aligned with the x direction. A right side 364 of the bolt head 358 joins the top side 360 with the bottom side 362, and conveniently can be made of a convex curve as shown. Bolt head 358 otherwise can be a hex, a square or be in any other shape that includes a straight horizontal top side 360 and a straight horizontal bottom side 362.

Bolt head top side 360 slidably engages with recess top sidewall 354, and bolt head bottom side 362 slidably engages with recess bottom sidewall 354. The recess top and bottom sidewalls thus keep the shaft of right jaw clamping screw 346 from turning. Other structure on the rear surface of the right jaw engagement plate 302 and the front face of the central support engagement plate 304, described below, may instead or may in addition provide limits on the left and right travel of right jaw engagement plate 302.

A right recess end wall 366 (FIG. 6) is complementarily shaped to receive right side 364 of bolt head 358. Contact of these two surfaces may act as a stop to limit the leftward travel of right jaw 144, as may the contact of closed right slot end 348 with the shaft of the clamping screw 346.

Figure 5:
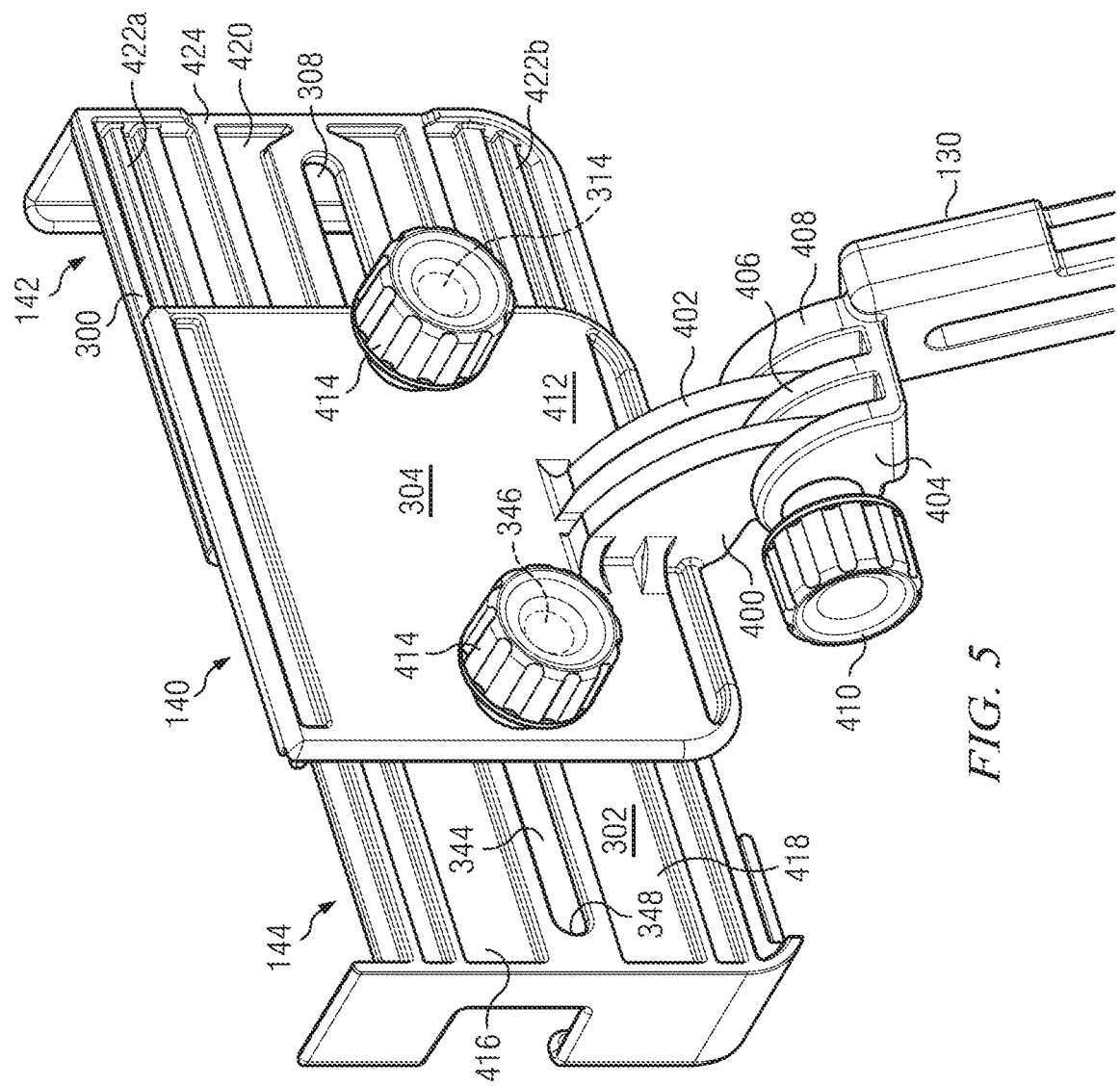
FIG. 5 is a back perspective view of the mounting bracket assembly as configured in FIG. 4.

As seen in FIG. 5, a pair of downwardly depending support plates 400 and 402 are received in channels defined by a left plate 404, central plate 406 and right plate 408 of the extension link 130. Alternatively, plates 400 and 402 could be received in channels created by analogous pier plates of the base 102 or 200. The shaft of an upper extension link clamping screw 410 is threaded through bores made in support plates 400 and 402, and in plates 404, 406 and 408, or this screw 410 is used to attach support plates 400 and 402 to pier plates of base 102 or 200. In any event, the mounting bracket is rotatable as a unit around a horizontal axis passing down the center of the clamping screw 410.

The upper ends of support plates 400 and 402 are joined to a rear face 412 of the central support engagement plate 304. In the illustrated embodiment, the rear face 412 is mostly flat and does not have formed therein an engagement surface for engaging the other engagement plates 300, 302. Each of the jaw clamping screws 314, 346 has a knob 414 that turns on a threaded shaft of the clamping screw in question. Since the shafts of screws 314, 346 are rotationally fixed, each knob 414 may be tightened with one hand. The knobs 414 are loosened by the user to permit the horizontal sliding of left jaw 142 and/or right jaw 144, and then tightened to independently fix each jaw 142, 144 in the desired position.

The right jaw engagement plate 302 has a rear face 416 on which is formed a corrugated central support engagement surface 418. The left jaw engagement plate 300 has a rear face 420 on which is formed a central support engagement surface made up of surfaces 422a and 422b. Central support engagement surface 422a is disposed near the top of rear face 420, while central support engagement surface 422b is disposed near the bottom of rear face 420. The central support engagement surfaces 422a and 422b slidably engage with a front face (described below) of the central support engagement plate 304.

Further corrugations are formed on rear face 416 to make up a right jaw engagement surface 424. The right jaw engagement surface 424 of the left jaw engagement plate 300 slidably engages with the front face 340 of the right jaw engagement plate 302.

The central support 140 is shown by itself in FIG. 6. A front face 500 of the central support engagement plate has a plurality of horizontally elongate corrugations that for surfaces that engage the left jaw engagement plate or the right jaw engagement plate. An elongate top rib 502 and an elongate bottom rib 504 protrude forwardly from front face 500. A top surface 506 of the top rib 502, and a channel or groove 508 bounded on its lower side by the top rib 502, form an upper left jaw engagement surface 510a that engages with an upper portion of the rear face 420, and in particular central support engagement surface 422a, of the left jaw engagement plate 300. A bottom surface 512 of the bottom rib 504, and a channel or groove 514 bounded on its upper side by the bottom rib 504, form a lower left jaw engagement surface 510b that engages with a lower portion of the rear face 420 of left jaw engagement plate 300, and in particular central support engagement surface 422b thereof.

Other grooves and ribs on front face 500 form a right jaw engagement surface 516 that slidably engages with the central support engagement surface 428 formed on the rear face 426 of the right jaw engagement plate 302. These corrugations include, from top to bottom, a lower surface, 518 of the rib 502, a rib 520 that does not protrude forwardly as much as rib 502, a groove 522 immediately below the rib 520, a rib 524 bounding the bottom side of groove 522, a horizontal top member 526 of a square 528 molded into a far right portion of front face 500, a groove 530 defined by and separating rib 524 and top member 526, a horizontal bottom member 532 of the square 528, a central rib or boss 534 that in use occupies a portion of slot 344 of right jaw 144, a groove 536 defined by and separating square bottom member 532 from central rib 534, a horizontal top member 538 of a square 540 molded into a far right portion of the front face 500 so as to be below and in registry with the square 528, a groove 542 defined by and separating central rib 534 from square top member 538, a horizontal bottom member 544 of square 540, a rib 546 spaced below bottom member 544, a groove 548 defined by and separating bottom member 544 from rib 546, a groove 550 immediately adjacent a bottom surface of rib 546, a rib 552 adjoining the bottom of groove 550 and not projecting forwardly as much as rib 504, and a top surface 554 of the rib 504. These corrugations constrain movement of the right jaw 144 relative to the central support 140 to the x or –x directions, and stiffen the central support 140. Since it protrudes into right jaw slot 344, the central rib 534 projects forwardly ore than do ribs 520, 524, 546 or 552, or square members 526, 532, 538 or 544.

A bore 556 is made through engagement plate 304 and through the central rib 534. This bore accepts the shaft of the left jaw clamping screw 314. A bore 558 is located in the right portion of engagement plate 304, is horizontally aligned to rib 534, and is adapted to receive the shaft of right jaw clamping screw 346.

Most of the ribs and grooves formed on the front face 500 of engagement plate 304 are horizontally elongate and have a substantially uniform cross section in any yz plane, but some do not. A vertical rib 560 closes and defines a left end of the groove 522. The vertical rib 560 is located on the left margin of the engagement plate 304. This acts as a stop for one of the ribs, later described, making up the central support engagement surface 418 of the right jaw engagement plate 302. A vertical rib 562 likewise is disposed on the left margin of plate 304, extends forwardly to a greater extent than does rib 560, and acts as a stop for vertical ribs, later described, located on the left end of the central support engagement surface 418 of right jaw engagement plate 302. A vertical rib 564 likewise is located on the left margin of plate 304 and acts as a stop for an end of one of the ribs, later described, of the central support engagement surface 418. Ribs 560-564 will come into contact with corresponding structure on the central support engagement surface 418 of right jaw engagement plate 302 when the right jaw engagement plate 302 is in a fully closed condition relative to plate 304.

Ribs 560-564 can aid in limiting the leftward travel of right jaw engagement plate 302. Two other strictures, a vertical member 568 of square 528 and a vertical member 570 of square 540, cooperate with structure (later described) in central support engagement surface 418 of right jaw engagement plate 302 to limit the rightward travel of right jaw engagement plate 302. In this embodiment, since the ends of vertical ribs 568 and 570 are each joined to two horizontal members of a square, the vertical ribs 568 and 570 have increased resistance to shear forces.

As seen in FIG. 7, the left jaw engagement surface 342 of tight jaw engagement plate 302 is made up of a series of corrugations in the front face 340 of plate 302. The corrugations are horizontally elongate and, except for a taper at their left ends, have a substantially uniform yz cross section. From top to bottom, these corrugations include a top rib 600, a groove 602 disposed below rib 600, a rib 604 bounding groove 602, a rib 606 downwardly spaced from rib 604, a groove 608 disposed immediately below rib 606, a rib 610 disposed immediately below groove 608, and a rib 612 spaced below rib 610.

The recess 352 is disposed in the middle of a wide flat space or groove 614 that fits to a wide rib, later described, of the right jaw engagement surface 424 on left jaw engagement plate 302. Below space 614 is a rib 616. A rib 618 is spaced below rib 614. A groove 620 is disposed immediately below rob 618. A rob 622 is disposed immediately below the groove 620. A rib 624 is spaced below rib 622. A groove 626 is disposed immediately below groove 622. A bottom rib 628 is disposed immediately below groove 626.

Ribs 604, 606; 610, 612; 616, 618 and 622, 624 are molded in pairs per standard plastic mold design. In alternative embodiments, one or more of these rib pairs could be replaced with wide ribs not having any intervening groove. The grooves separating the rib pairs 604, 606; 610, 612; 616, 618 and 622, 624 will not engage any corresponding ribs in the right jaw engagement surface 424 of left jaw 300, but in other embodiments, additional ribs could be formed as a part of engagement surface 424 to slide in these intervening grooves.

FIG. 7 reveals that while slot 344 has an open left end, the recess 352 surrounding it does not. Instead, a left sidewall 630 of recess 352 joins top recess sidewall 354 to bottom recess sidewall 356, interrupted by slot 344. The shape of the left sidewall 354 should conform to the shape of the left side of right jaw bolt head 358, and where bolt head 358 is curved as illustrated, the left sidewall 630 should be complimentarily curved to conform to the bolt head 358.

The sidewall 148 of right jaw 144 extends forwardly from engagement plate 302 sufficiently to accommodate the depth of most cell phones, even when jacketed. A forward end of the sidewall 148 terminates in a lip 632. A vertical, section 634 of lip 632 extends laterally inwardly a vertical section 636 of the sidewall 148. A horizontal section 638 of lip 632, herein appearing as a small triangular gusset, extends upwardly from a horizontal section 640 of the sidewall 148. The lip 632 extends inwardly and upwardly in an xy plane parallel to but spaced forwardly of the xy plane in which the right jaw engagement plate 302 substantially resides, helping to contain the cell phone mounted in the mount 100.

The horizontal section 640 of sidewall 148 extends laterally inwardly to an inner end 642. Even when the right jaw 144 is in its leftmost, closed condition as seen in FIG. 1, the inner end 642 will be spaced from a similar inner end of a horizontal sidewall segment of left jaw 142, thereby permitting the insertion of a power/communications cord into the bottom of the cell phone when the cell phone is being held in a "portrait" orientation.

Because the invention permits a cell phone or the like to be held in a "landscape" orientation, provision is made for a power/communications cord plugging into a port that is then on a vertical side of the electronic device. Hence, in FIG. 7, there is seen a channel or notch 644 that is formed in sidewall 148 and lip 632. The channel 644 is wide enough, in a z direction, that it will accommodate some variation in the width of the electronic device and in the position of the communications port on what is then a vertical side of the device. In the illustrated embodiment, only the right sidewall 148 has such a channel 644. In other embodiments, a similar channel could be made in left sidewall 146, and the extent of the channel(s) could be varied from the embodiment shown.

It is preferred that open-ended channels be used for the power/communications cord rather than closed holes, as this permits the installation and removal of a cell phone and a connected cord or cable without disconnecting and reconnecting the cord from and to the phone. Further, lip 632 intentionally does not extend upward beyond channel 644, so as to make the insertion and removal of a cell phone in "landscape orientation, and with a charging cord attached, easier.

Figure 8:
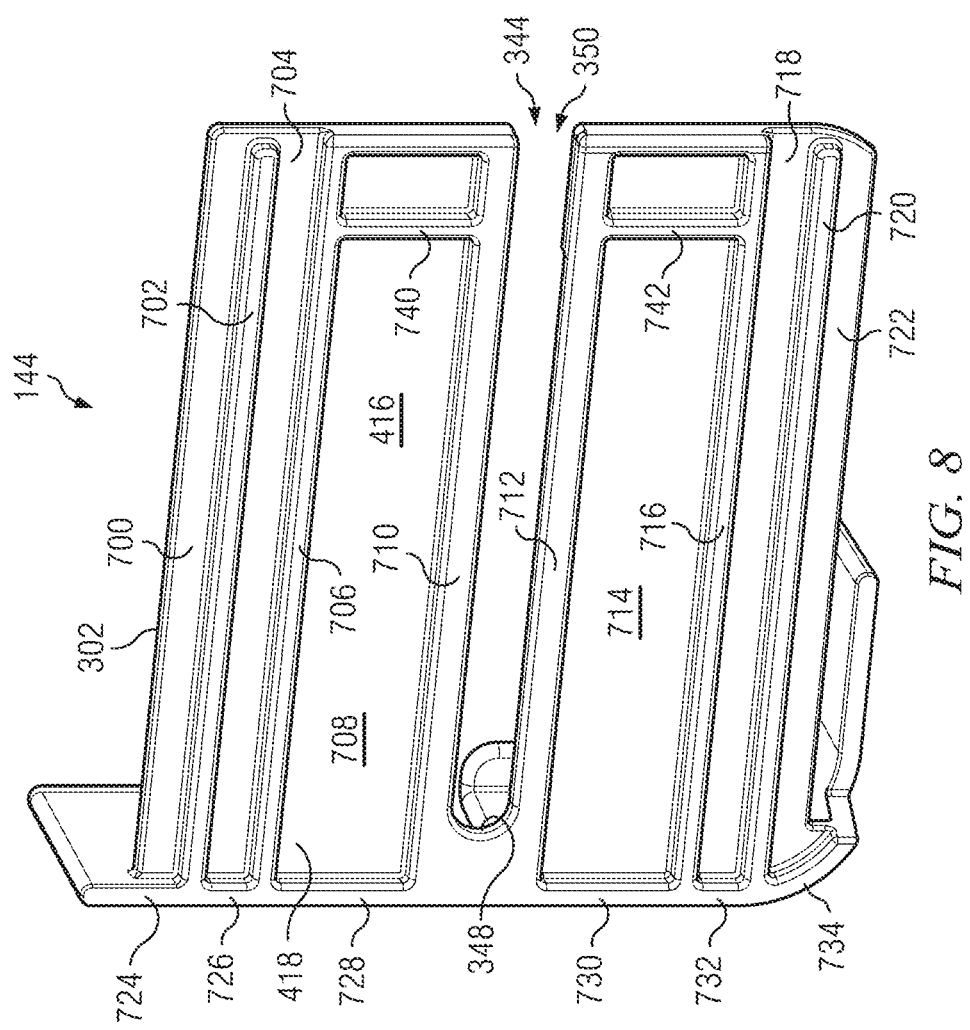
FIG. 8 is a back perspective view of the right jaw shown in FIG. 7.

FIG. 8 shows the details of the rear face 426 of the right jaw engagement plate 302 and of the central support engagement surface 418 formed thereon. The central support engagement surface 418 comprises a plurality of horizontally elongate corrugations of substantially uniform yz cross-section along their lengths. These corrugations include a top groove 700 which fits to the forward surface of rib 520 formed on the front face 500 of the central support engagement plate 304 (FIG. 6). Immediately below this, a rib 702 in rear face 416 fits into groove 522 on front face 500. All ribs of the central support engagement surface 418 extend rearwardly. A groove 704 in rear face 416 accepts the rib 524 formed on front face 500. A horizontal rib 706 is formed immediately below groove 704. This rib 706 fits into groove 530 on front face 500. A wide flat space or groove 708 is disposed immediately below rib 706 and is bounded on its bottom side by a horizontal rib 710. The square 528 formed on front face 500 horizontally slides within space 708. The rib 710 fits into groove 536 on front face 500.

A rib 712 on rear face 416 is disposed immediately below slot 344. Rib 712 fits into groove 542 on from face 500. A wide space or groove 714 extends from the rib 712 to a rib 716. The square 540 formed on front face 500 slides within space 714. The rib 716 on rear face 416 fits into groove 548 on front face 500. A horizontal groove 718 is disposed immediately below rib 716 and accepts rib 546 on front face 500. A rib 720 is disposed immediately below groove 718 and fits into groove 550 on front face 500. Finally, a groove or flange 722 on rear face 416 accepts rib 552 on front face 500.

A series of vertical ribs or rib segments formed as a portion of the central support engagement surface 418 coact with structure on the right jaw engagement surface 516 formed on the from face 500 of central support engagement plate. On the right margin of engagement plate (leftmost in FIG. 7) are rearwardly extending vertical rib segments 724, 726, 728, 730 and 732, and an arcuate end rib segment 734. Each of these vertical rib segments may act as a stop to prevent further leftward movement of right jaw engagement plate 302 relative to central support engagement plate 304. In the closed configuration, vertical rib segment 724 may abut the right end of rib 520 on front face 500 of plate 304. Segment 726 may abut the right end of rib 524. Segment 528 may abut a rightmost vertical member 736 of the upper square 528. In a similar fashion, segment 730 may abut a rightmost vertical member 738 of the lower square 540. Segment 732 may abut the right end of rib 546, and the concavely arcuate rib segment 734 may abut the convexly arcuate end of rib 552.

Other structure of surface 418 limits travel of the right jaw 144 in a rightward direction and defines a fully open configuration of the right jaw 144 relative to the central support 140. In the illustrated embodiment, this structure includes a rearwardly extending vertical rib segment 740, which will abut vertical square member 568 when the right jaw is in the fully open configuration, and vertical rib segment 742, which will abut left vertical member 570 of lower square 540 in this condition. Thus, the square 528 slides within the rectangular space 708, while the lower square 540 slides within rectangular space 714 when jaw 144 is moved horizontally relative to central support 140.

Figure 9:
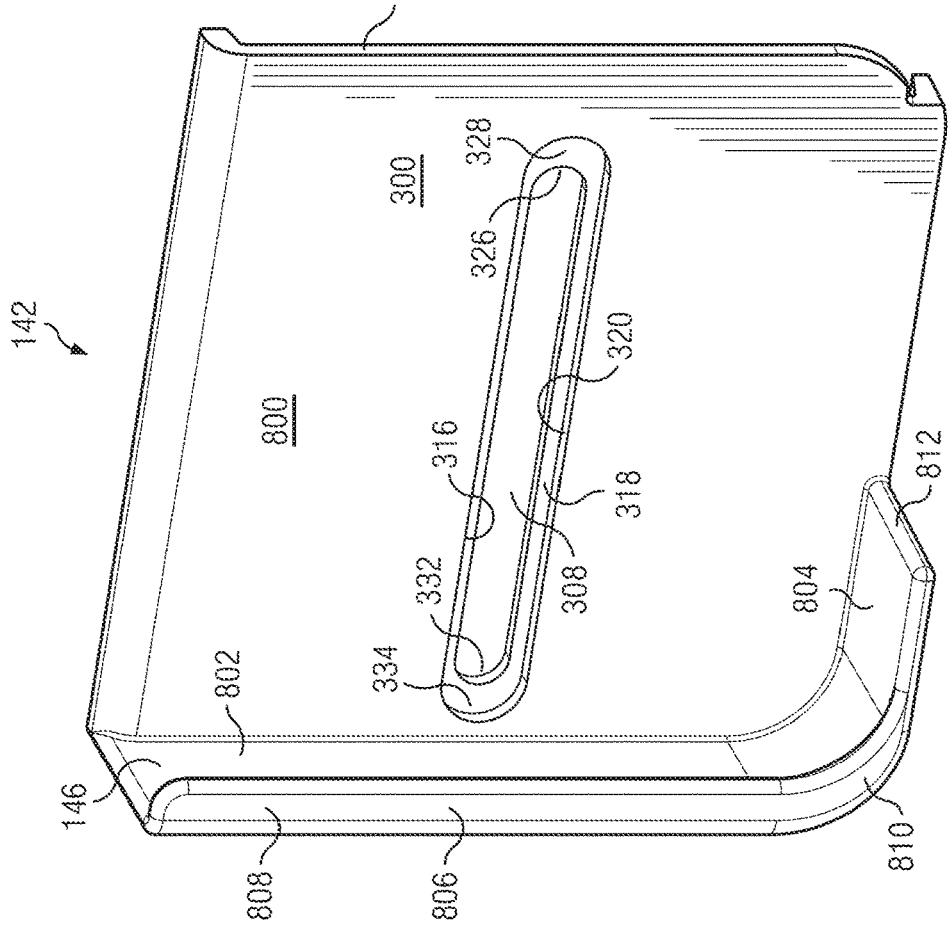
FIG. 9 is a front perspective view of a left jaw used in the mounting bracket assembly shown in FIGS. 3-5.
Figure 13:
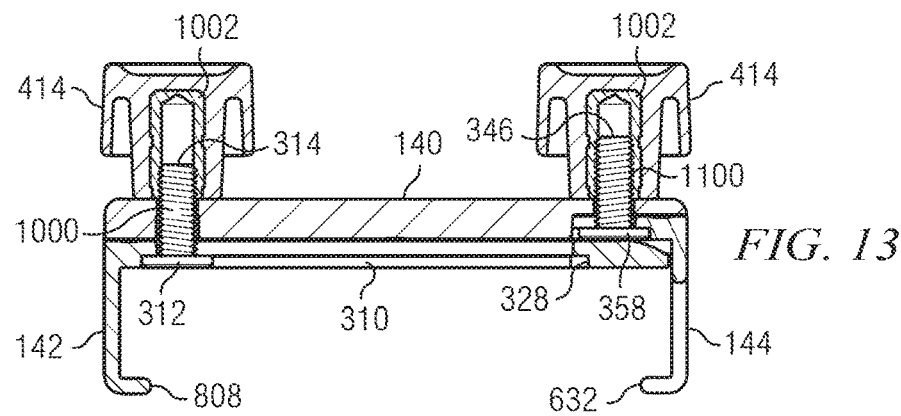
FIG. 13 is a sectional view taken substantially along Line 13-13 of FIG. 1.

FIG. 9 is a magnified view of the left jaw 142. A front face 800 of the left jaw engagement plate 300 has no engagement surface for engaging either of the engagement plates 302, 304, and as such it is mostly smooth. The left jaw sidewall 146 has a vertical section 802 and, joined to it by a curved transition, a horizontal section 804. The left jaw sidewall 146 forwardly extends from the front face 800 by an amount chosen to accommodate most large cell phones, even when jacketed. A depth in the y direction of sidewall 146 will be less than a depth in this direction of right jaw sidewall 148, to account for the thickness of the left jaw engagement plate 300 that will occupy a portion of the depth of right sidewall 148. Sidewall 146 forwardly extends to a lip 806. The lip 806 has a vertical section 808 that laterally inwardly extends from sidewall vertical section 802. The lip 806 further has a horizontal section 810 that upwardly extends from sidewall horizontal section 804. In this embodiment, the horizontal lip section 810 consists of a triangular gusset. The lip 806 acts to contain the lower end of a cell phone or other electronic device being held by mount 100.

Sidewall horizontal section 804 terminates at a lateral inner end 812; the length in an x direction of the horizontal section 804 is much less than a total width in this direction of engagement plate 300. When the left jaw 142 and the right jaw 144 are in their closed configuration, there will still be a substantial space between inner end 812 and inner end 642 of the right jaw 144 (FIG. 6). This permits the insertion of a power/communications cable into a port on the bottom of the cell phone when the cell phone is being held in a "portrait" position.

Figure 10:
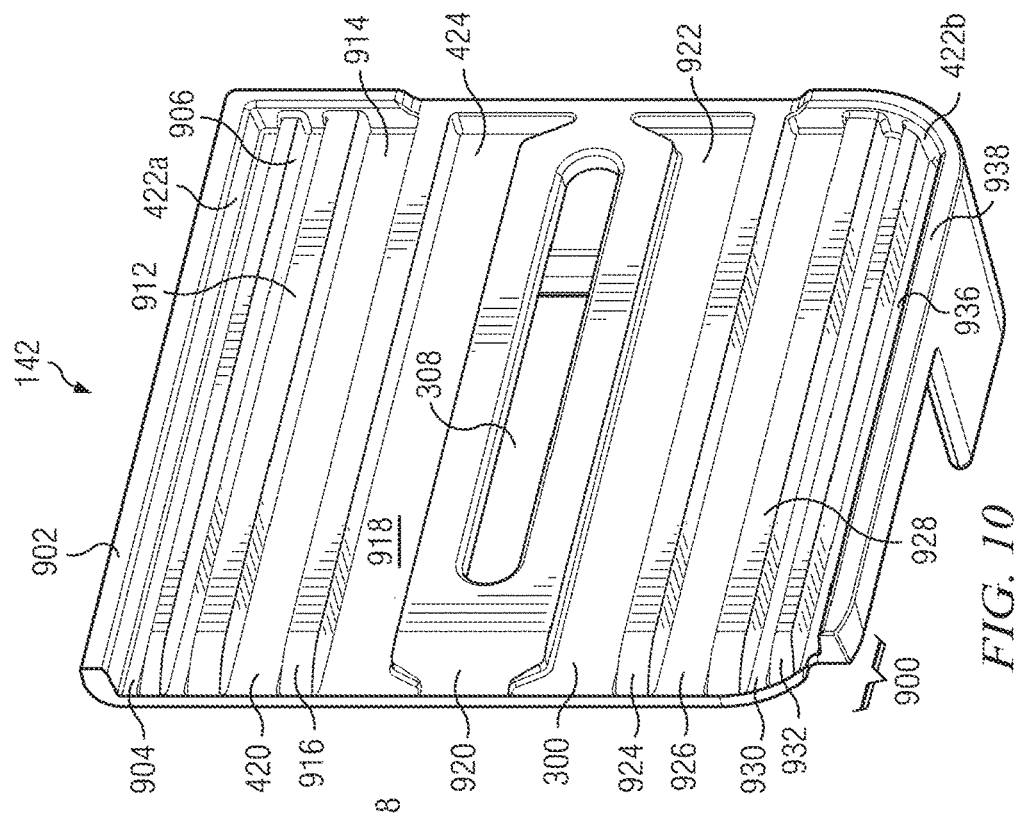
FIG. 10 is a back perspective view of the left jaw shown in FIG. 9.

As seen in FIG. 10, the rear face 420 of the left jaw engagement plate 300 has a series of horizontal corrugations which, except for their tapering at a rightmost region 900, have uniform yz cross sections. These corrugations include multiple ribs and grooves and are divided into a right jaw engagement surface 424, occupying a center of rear face 420, and a pair of central support engagement surfaces 422a, 422b, located at the top and bottom of the rear face 420, respectively.

The top central support engagement surface 422a includes a rib 902 that is received within groove or on flange 508 (FIG. 6) of the left jaw engagement surface 510a on central support engagement plate 304. Immediately below this is a groove 904 that accepts rib 502 of engagement surface 510a.

At this point the top central support engagement surface 422a ends and the right jaw engagement surface 424 begins. A rib 906, immediately adjacent groove 904, fits to a top flange or groove 908 on the front face 340 of right jaw engagement plate 302 (FIG. 6). Next, a groove 910, immediately below rib 906, accepts the rib 600 on front face 340. A rib 912, disposed immediately below groove 910, on rear face 420 is received in the groove 602 of from face 340. A relatively wide (in a z direction) groove 914 is disposed immediately below rib 912. Groove 914 accepts the pair of ribs 604, 606 formed on front face 340. In alternative embodiments groove 914 could be divided into two grooves by an intervening rib, and in that instance each rib 604, 606 would be accepted in a respective groove.

The lower boundary of groove 914 is defined by a rib 916, which is received by groove 608 in front face 340. Immediately below rib 916 on ea face 420 is a wide groove 918 into which ribs 610, 612 on front face 340 are slidably received. In an alternative embodiment the wide groove 424 could be separated into two parallel grooves by an intervening rib, and in that instance one such groove would receive rib 610 and the other groove would receive rib 612.

A central boss or rib 920 is formed around left jaw slot 308. Rib 920 is received within groove space 614 on front face 340. Immediately below this is a wide groove 922 that slidably receives the pair of ribs 616, 618 formed on front face 340. In an alternative embodiment, the wide groove 922 would be split into two grooves by an intervening rib, each of which would then accept one of the ribs 616, 618. Immediately below groove 922 is a rib 924 that is accepted into groove 620 on front face 340. Immediately below rib 924 on rear face 420 is a wide groove 926, into which are received the pair of ribs 622, 624 on front face 340. In an alternative embodiment the wide groove 926 would be split up into two grooves by an intervening rib, and in that instance each such groove would receive one of the ribs 622, 624.

Immediately below groove 926 on rear face 420 is a rib 928. The rib 926 is received within groove 626 on front face 340. Immediately below rib 928 on rear face 420 is a groove 930. The groove 930 accepts the rib 628 formed on front face 340. Immediately below groove 930 is a rib 932. Rib 932 rides on a bottom flange 934 formed on front face 340.

At this point the right jaw engagement surface 424 formed on rear face 420 ends and the lower central support engagement surface 422b begins. The lower support engagement surface 422b includes a groove 936 which accepts rib 504 formed on the front face 500 of central support engagement plate 304. Finally, a bottom rib 938, formed immediately below groove 936 on rear face 420, is received within bottom groove or flange 514 on front face 500.

FIG. 11 is a yz sectional view of the mounting bracket 106 down the center of shaft 1000 of left jaw clamping screw 314, while FIG. 12 is a yz sectional view of the mounting bracket down the center of shaft 1100 of right jaw clamping screw 346, both taken of bracket 106 in the completely closed configuration. These sectional views show how the various surfaces and corrugations of the left jaw engagement plate 300, the right jaw engagement plate 302 and the central support engagement plate 304 fit together. The shaft 1000 of clamping screw 314 is inserted through left jaw slot 308, right jaw slot 344 and bore 556. Threads on shaft 1000 preferably engage with threads on a metal insert 1002 of knob 414. The shaft 1100 of clamping screw 346 is inserted only through right jaw slot 344 and bore 558; in the fully closed configuration, the clamping screw 346 is not visible from the front. Threads on shaft 1100 preferably engage with threads on a metal insert 1002 of knob 414.

Figure 14:
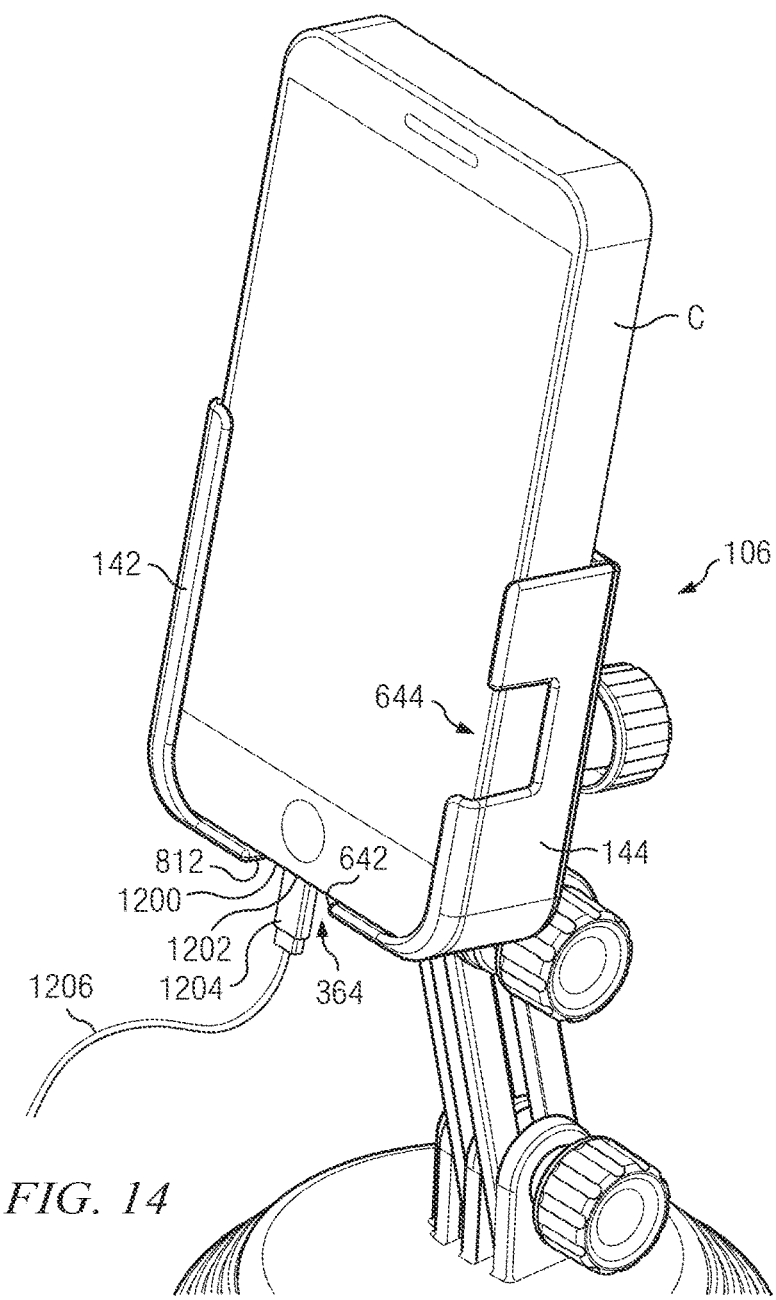
FIG. 14 is a front perspective view of a mount according to the in as holding a cell phone in a lengthwise or "portrait" orientation.

FIG. 14 illustrates a use of the mounting bracket 106 to hold a cell phone C in "portrait" mode. In this mode or configuration, a bottom side 1200 of cell phone C is positioned on the bottom. The side 1200 has a power/communications port 1202 that accepts a jack 1204 of a power/communications cable or charging cord 1206. Even when jaws 142 and 144 are closest together, inner ends 642 and 812 will be separated from each other, affording an access channel or notch for cable 1206 and jack 1204.

Figure 15:
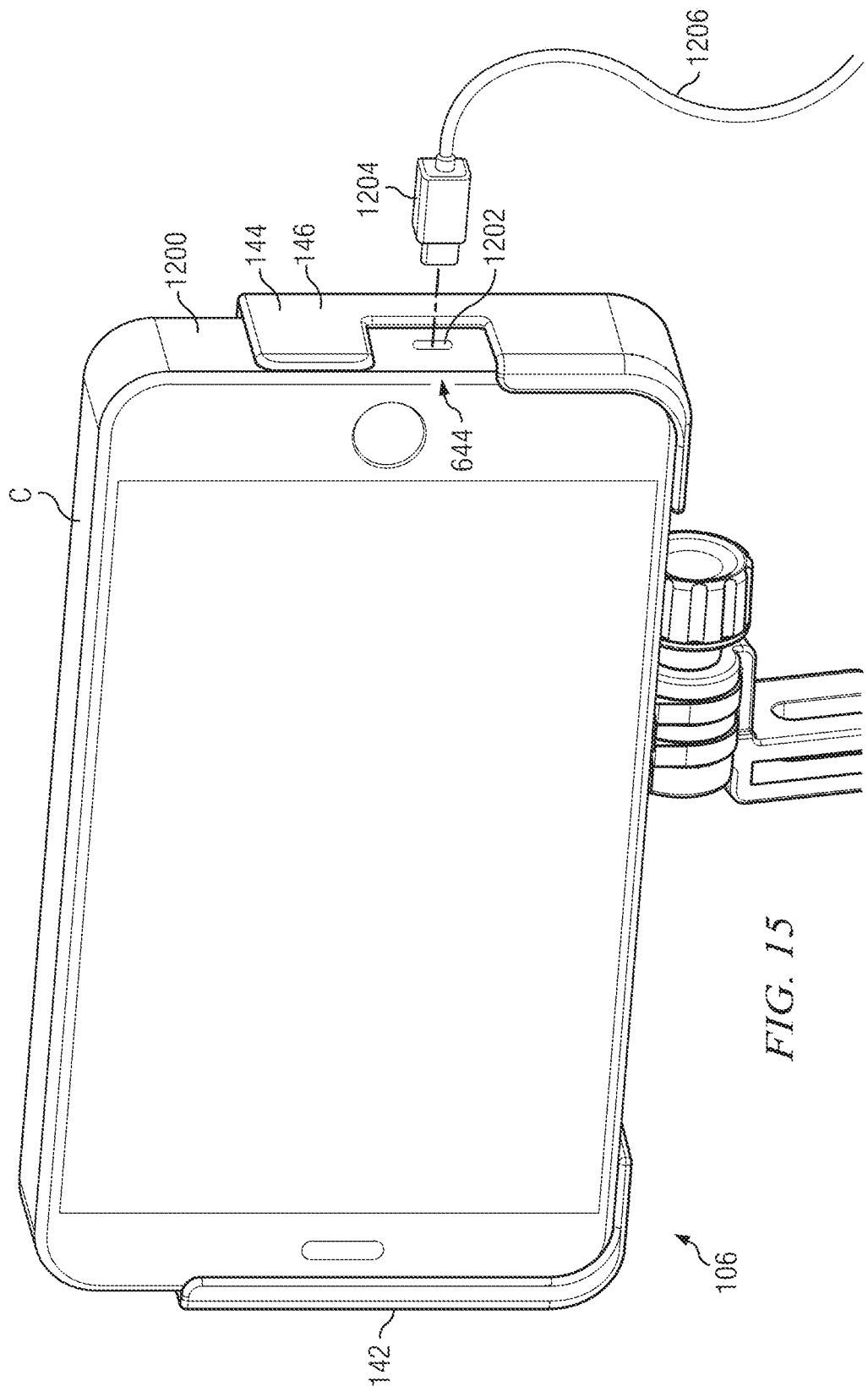
FIG. 15 is a front perspective view of the mount shown in FIG. 14, but with the cell phone held in widthwise or "landscape" orientation.

In FIG. 15, mounting bracket 106 is in the "landscape" configuration, in which jaws 142 and 144 are furthest apart from each other. Where cell phone C is not as long as one with the maximum length capable of being accommodated by bracket 106, and one or both of the jaws 142, 144 may be moved inwardly and fixed in place to accommodate a smaller cell phone length, it is possible to independently move jaws 142 and 144 so that one is farther away from the axis of the base than is the other. In this way, a center of cell phone C may intentionally be offset, to the left or to the right, from the base axis.

When cell phone C is being held in "landscape" orientation as is shown in FIG. 15, the cell phone side 1200 where port 1202 is located will be oriented vertically. In the illustrated embodiment, the user chooses to make side 1200 the right side of cell phone C. In this orientation, the channel 644 in right jaw 146 exposes the power/communications port 1202, so that jack 1204 may be plugged into it. In either the "portrait" configuration shown in FIG. 14 or the "landscape" configuration shown in FIG. 15, the user is able to install and remove the cell phone C from bracket 106 without disconnecting the cable 1206.

In summary, a personal electronic device mount has been shown and described in which first and second jaws may be moved independently of each other and fixed in place relative to a central support. Engagement plates of a left jaw and a right jaw each bear horizontally elongate corrugations that reinforce the jaws and constrain the jaws to horizontal movement. The central support likewise has corrugations, and surfaces on each of the left jaw, right jaw and central support interface with mating surfaces of each of the other ones of the left jaw, right jaw and central support. The mount may accommodate devices in either a "portrait" or a "landscape' orientation and allow the insertion and removal of a cell phone without disconnecting its charging cord.

While illustrated embodiments of the present invention have been described, and illustrated in the appended drawings, the present invention is not limited thereto but only by the scope and spirit of the appended claims.

I claim:

1. A mount for a personal electronic device, the mount comprising:
    a base;
    a mounting bracket supported by the base and coupled thereto by a connector, the mounting bracket comprising a central support joined to the connector, a left jaw and a right jaw;
    the central support having a central support engagement plate, the central support engagement plate having a left jaw engagement surface and a right jaw engagement surface, each engagement surface of the central support engagement plate having a plurality of horizontally elongate; central support corrugations;
    the right jaw having a right jaw engagement plate that is operable to slide horizontally with respect to the central support engagement plate, the right jaw engagement plate having a central support engagement surface and a left jaw engagement surface, each engagement surface of the right jaw engagement plate having a plurality of horizontally elongate, right jaw corrugations;
    the left jaw having a left jaw engagement plate that is operable to slide horizontally with respect to the central support engagement plate and the right jaw engagement plate, the left jaw engagement plate having a central support engagement surface and a right jaw engagement surface, each engagement surface of the left jaw engagement plate having a plurality of horizontally elongate, left jaw corrugations;
    wherein ones of the right jaw corrugations are operable to slide along ones of the central support corrugations, wherein others of the right jaw corrugations are operable to slide along ones of the left jaw corrugations, and wherein ones of the left jaw corrugations are operable to slide along ones of the central support corrugations, thereby permitting the independent sliding adjustment of the left jaw with respect to the central support and the right jaw with respect to the central support in order to fit to a predetermined length of the electronic device; and
    at least one clamp for affixing the left jaw to the central support and for affixing the right jaw to the central support.

2. The mount of claim 1, wherein the right, aw and the left jaw may be slidably adjusted to fit either a predetermined length of the personal electronic device or a predetermined width of the personal electronic device.

3. The mount of claim 1, wherein said at least one clamp is one of first and second clamps, the first clamp affixing the left jaw to the central support, the second camp affixing the right jaw to the central support.

4. The mount of claim 1, wherein the corrugations of the central support, the right jaw and the left jaw each include at least one rib and at least one groove.

5. The mount of claim 1, wherein the central support engagement plate is disposed to the rear of the right jaw engagement plate, the central support engagement plate having a front face, the right jaw engagement plate having a rear face, the right jaw engagement surface of the central support plate being a portion of the front face of the central support engagement plate.

6. The mount of claim 1, wherein the central support engagement plate is disposed to the rear of the left jaw engagement plate, the left jaw engagement plate having a rear face, the central support engagement surface of the left jaw engagement plate being a portion of the rear face, the central support engagement plate having a front face, the left jaw engagement surface of the central support plate being a first portion of the front face of the central support engagement plate.

7. The mount of claim 6, wherein the central support engagement plate is disposed to the rear of the right jaw engagement plate, the right jaw engagement plate having a rear face, the right jaw engagement surface of the central support engagement plate being a second portion of the front face of the central support engagement plate, the second portion being different from the first portion, the central support engagement surface of the right jaw engagement plate operable to slide along the second portion of the front face of the central support engagement plate.

8. The mount of claim 1, wherein the right jaw engagement plate is disposed forwardly of the central support engagement, plate, the right jaw engagement plate having a rear face and the central support engagement plate having a front face, the central support engagement surface of the right jaw engagement plate being a portion of the rear face of the right jaw engagement plate, the central support engagement surface of the right jaw engagement plate operable to slide horizontally along the front face of the central support engagement plate.

9. The mount of claim 1, wherein the right jaw engagement plate is disposed rearwardly of the left jaw engagement plate, the right jaw engagement plate having a front face and the left jaw engagement plate having a rear face, the right jaw engagement surface of the left jaw engagement plate being a portion of the rear face of the left jaw engagement plate, the right jaw engagement surface of the left jaw engagement plate operable to slide horizontally along the from face of the right jaw engagement plate.

10. The mount of claim 9, wherein the right jaw engagement plate is disposed forwardly of the central support engagement plate, the right jaw engagement plate having a rear face opposed to the front face of the right jaw engagement plate, the central support engagement plate having a front face, the central support engagement surface of the right jaw engagement plate being fort ed on the rear face of the right jaw engagement plate, the central support engagement surface of the right jaw engagement plate operable to slide horizontally along the front face of the central support engagement plate.

11. The mount of claim 1, wherein the left jaw engagement plate is disposed forwardly of the central support engagement plate, the left jaw engagement plate having a rear face, the central support engagement surface of the left jaw engagement plate being a portion of the rear face of the left jaw engagement plate, the central support engagement plate having a front face, the left jaw engagement surface of the central support engagement plate being a portion of the front face of the central support engagement plate, the central support engagement surface of the left jaw engagement plate operable to slide horizontally along the front face of the central support engagement plate.

12. The mount of claim 1, wherein the left jaw engagement plate is disposed forwardly of the right jaw engagement plate, the left jaw engagement plate having a rear face, the right jaw engagement surface of the left jaw engagement plate being a first portion of the rear face, the right jaw engagement plate having a front face, the left jaw engagement surface of the right jaw engagement plate being formed on the front face of the right jaw engagement plate, the right jaw engagement surface of the left jaw engagement plate operable to slide horizontally along the front face of the right jaw engagement plate.

13. The mount of claim 12, wherein the left jaw engagement plate is disposed forwardly of the central support engagement plate, the central support engagement plate having a front face, the left jaw engagement surface of the central support engagement plate formed on a portion of the front face of the central support engagement plate, the central support engagement surface of the left jaw engagement plate being a second portion of the rear face of the left jaw engagement plate, the second portion being different from the first portion, the central support engagement surface of the left jaw engagement plate operable to slide horizontally along the front face of the central support engagement plate.

14. The mount of claim 1, wherein the base is selected from the group consisting of a stand adapted to be placed on a horizontal surface, and an adapter adapted to be inserted into a vehicle cup holder.

15. The mount of claim 1, wherein the connector comprises an elongate extension link, an upper end of the extension link rotatably affixed to the central support, a lower end of the extension link connected to the base.

16. The mount of claim 1, wherein the central support is rotatable around a horizontal axis relative to the base.

17. A mount for a personal electronic device comprising:
a base;
a mounting bracket supported on the base and coupled thereto by a connector, the n mounting bracket comprising a central support coupled to the connector, a left jaw slidably connected to the central support, a right jaw slidably connected to the central support;
the central support having a central support engagement plate;
the left jaw having a left jaw engagement plate disposed to be substantially parallel to the central support engagement plate, the left jaw engagement plate adapted to horizontally slide with respect to the central support engagement plate, a side wall of the left jaw extending forwardly from the left jaw engagement plate to a front end, the side wall having a vertical section and a horizontal section, a vertical forward lip of the left jaw extending horizontally inwardly from the front end ref the vertical section of the side wall of the left jaw, a horizontal forward lip of the left jaw extending upwardly fro the from end of the horizontal section of the side all of the left jaw;
the right jaw having a right jaw engagement plate disposed to be substantially parallel to the central support engagement plate and the left jaw engagement plate, the right law engagement plate adapted to horizontally slide with respect to the central support engagement plate and with respect to the left jaw engagement plate, a side wall of the right jaw extending forwardly from the right jaw engagement plate to a front end thereof, the side wall of the right jaw having a vertical section and horizontal section, a vertical forward lip of the right jaw extending horizontally inwardly from the front end of the vertical section of the side wall of the right jaw, a horizontal forward lip of the right jaw extending upwardly from the front end of the horizontal section of the side wall of the left jaw;
a left clamp for clamping the left jaw engagement plate to the central support engagement plate; and
a right clamp for clamping the right jaw engagement plate to the central support engagement plate.

18. The mount of claim 17, wherein a first jaw is one of the right and left jaws and a second jaw is the other of the right and left jaws, an engagement plate of the first jaw being disposed rearwardly of the engagement plate of the second jaw, a horizontally elongate first slot formed in the engagement plate of the first jaw, a horizontally elongate second slot being formed in the engagement plate of the second jaw and to be in alignment with the first slot;
 a first clamp being one of the left and right clamps and a second clamp being the other of the left and right clamps, a shaft of the first clamp passing through the first slot, a shaft of the second clamp passing through the first slot and the second slot.

19. The mount of claim 18, wherein a front end of the shaft of the first clamp terminates in an enlarged head and a front end of the shaft of the second clamp terminates in an enlarged head, the engagement plate of the first jaw having a general from face, a first recess in the general front face of the engagement plate of the first jaw surrounding the first slot, the head of the first clamp received in the first recess, a second recess in the general front face of the engagement plate of the second jaw surrounding the second slot, the head of the second clamp received in the second recess.

20. The mount of claim 19, wherein the first and second clamps are screw clamps, the first recess having a top sidewall that extends from the general surface of the engagement plate of the first jaw to a floor of the first recess and a bottom sidewall that extends from the general surface of the engagement plate of the first jaw to the floor of the first recess and disposed in parallel to the top sidewall, the head of the first clamp having a straight top side adapted to slide along the top sidewall and a straight bottom side adapted to slide along the bottom sidewall, the top and bottom sidewalk of the first recess preventing the rotation of the first shaft, and
 the second recess having a top sidewall that extends from the general surface of the engagement plate of the second jaw to a floor of the second recess and a bottom sidewall that extends from the general surface of the engagement plate of the second jaw to the floor of the second recess, the head of the second clamp having a straight top side adapted to slide along the top sidewall of the second recess and a straight bottom side adapted to slide along the bottom sidewall of the second recess, the top and bottom sidewalls of the second recess preventing the rotation of the second shaft.

21. The mount of claim 17, wherein the right jaw engagement plate and the left jaw engagement plate are substantially disposed on different planes that are parallel to but spaced from each other, such that one of the left jaw engagement plate and the right jaw engagement plate may slide behind the other of the left jaw engagement plate and the right jaw engagement plate.

22. The mount of claim 17, wherein the base is selected from the group consisting of a stand adapted to be placed on a horizontal surface and an adapter for insertion into a vehicle cup holder.

23. The mount of claim 17, wherein the connector comprises an elongate extension link, a top end of the extension link rotatably affixed to the central support, a bottom end of the extension link opposite the top end thereof being affixed to the base.

24. The mount of claim 17, wherein the central support is rotatable relative to the base around a horizontal axis.

25. The mount of claim 17, wherein a cable channel is formed through at least one of the side wall of the first jaw and the side wall of the second jaw, the cable channel adapted to receive therethrough a power or communications cable to be plugged into the personal electronic device when the mounting bracket is holding the personal electronic device in a landscape orientation.

26. The mount of claim 25, wherein the vertical forward lip of said at least one of the side wall of the first jaw and the side wall of the second jaw does not upwardly extend beyond the cable channel.

27. The mount of claim 17, wherein the horizontal section of the side wall of the left jaw has an inner end and the horizontal section of the side wall of the right jaw has an inner end, the left and right jaws operable to be horizontally moved to a closed condition in which the left and right jaws are closest together, the inner end of the horizontal section of the left jaw being spaced from the inner end of the horizontal section of the right jaw when the left and right jaws are in the closed condition, such that a power or communications cable may be inserted through a space defined by the inner ends and plugged into a port of the personal electronic device when the mounting bracket is holding the personal electronic device in a portrait orientation.

* * * * *